(12) United States Patent
Sugahara et al.

(10) Patent No.: US 7,634,265 B2
(45) Date of Patent: Dec. 15, 2009

(54) RADIO WAVE PROPAGATION CHARACTERISTIC ESTIMATION SYSTEM, AND ITS METHOD AND PROGRAM

(75) Inventors: Hiroto Sugahara, Tokyo (JP); Yoshinori Watanabe, Tokyo (JP); Takashi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 751 days.

(21) Appl. No.: 10/556,128

(22) PCT Filed: Mar. 17, 2005

(86) PCT No.: PCT/JP2005/004764

§ 371 (c)(1),
(2), (4) Date: Nov. 9, 2005

(87) PCT Pub. No.: WO2005/088868

PCT Pub. Date: Sep. 22, 2005

(65) Prior Publication Data

US 2007/0093212 A1 Apr. 26, 2007

(30) Foreign Application Priority Data

Mar. 17, 2004 (JP) ............................. 2004-075477

(51) Int. Cl.
*H04W 24/00* (2006.01)
(52) U.S. Cl. .................... 455/423; 455/446; 455/67.11; 455/418; 455/422.1
(58) Field of Classification Search ... 455/422.1–426.2, 455/446, 67.11–67.7, 418–420; 703/2, 22
See application file for complete search history.

(56) References Cited

U.S. PATENT DOCUMENTS 5,623,429 A * 4/1997 Fortune et al. ................. 703/3

(Continued)

FOREIGN PATENT DOCUMENTS

JP 09-033584 2/1997

(Continued)

OTHER PUBLICATIONS

Y. Watanabe et al., "A High Speed Ray Launching Method by Hierarchical Determination of Ray Reception," 2004, The Institute of Electronics, Information and Communication Engineers Sogo Taikai.

*Primary Examiner*—Kamran Afshar
(74) *Attorney, Agent, or Firm*—Foley & Lardner LLP

(57) ABSTRACT

A radio wave characteristic estimation system and its method estimate radio wave propagation characteristics in an investigation object area in a part of a coverage area of a wireless system, which becomes an object of the estimation, at high speed and with high precision, when the coverage area is wide. In a three-dimensional area including a plurality of contents, a transmission source and the investigation object area to be investigated as to the propagation environment of radio waves emitted from the transmission source are provided. When estimating a radio wave propagation environment in the investigation object area, a general radio wave propagation situation acquisition unit finds general radio wave propagation situation within the investigation object area or in the vicinity thereof. A pseudo transmission source preparation unit prepares finite pseudo transmission sources to simulate the general radio wave propagation situation. A radio wave propagation estimation unit conducts detailed radio wave propagation estimation by designating the finite pseudo transmission sources as new transmission sources and an analysis area including the investigation object area as an analysis object.

25 Claims, 23 Drawing Sheets

U.S. PATENT DOCUMENTS

| | | | | |
|---|---|---|---|---|
| 5,752,167 A | * | 5/1998 | Kitayoshi | 455/67.11 |
| 7,171,208 B2 | * | 1/2007 | Rappaport et al. | 455/445 |
| 7,379,710 B2 | * | 5/2008 | Watanabe et al. | 455/67.11 |
| 2002/0002046 A1 | * | 1/2002 | Okanoue et al. | 455/423 |
| 2002/0094809 A1 | | 7/2002 | Watanabe et al. | |
| 2002/0107663 A1 | * | 8/2002 | Furukawa et al. | 702/181 |
| 2002/0132625 A1 | * | 9/2002 | Ogino et al. | 455/456 |
| 2005/0088165 A1 | * | 4/2005 | Watanabe et al. | 324/76.14 |

FOREIGN PATENT DOCUMENTS

| | | |
|---|---|---|
| JP | 11-186973 | 7/1999 |
| JP | 2002-139564 A | 5/2002 |
| JP | 2002-204199 A | 7/2002 |
| JP | 2002-214267 A | 7/2002 |
| JP | 2002-333459 A | 11/2002 |
| JP | 2003-318811 A | 11/2003 |

* cited by examiner

1: TRANSMISSION SOURCE (OUTDOOR BASE STATION)

OBSERVATION POINT 20
(RECEIVED POWER Pr_20)

INVESTIGATION OBJECT AREA 2 = ANALYSIS AREA 3

20: (RECEIVED POWER Pr_20)

FLOW CHART IN THIRD EXAMPLE

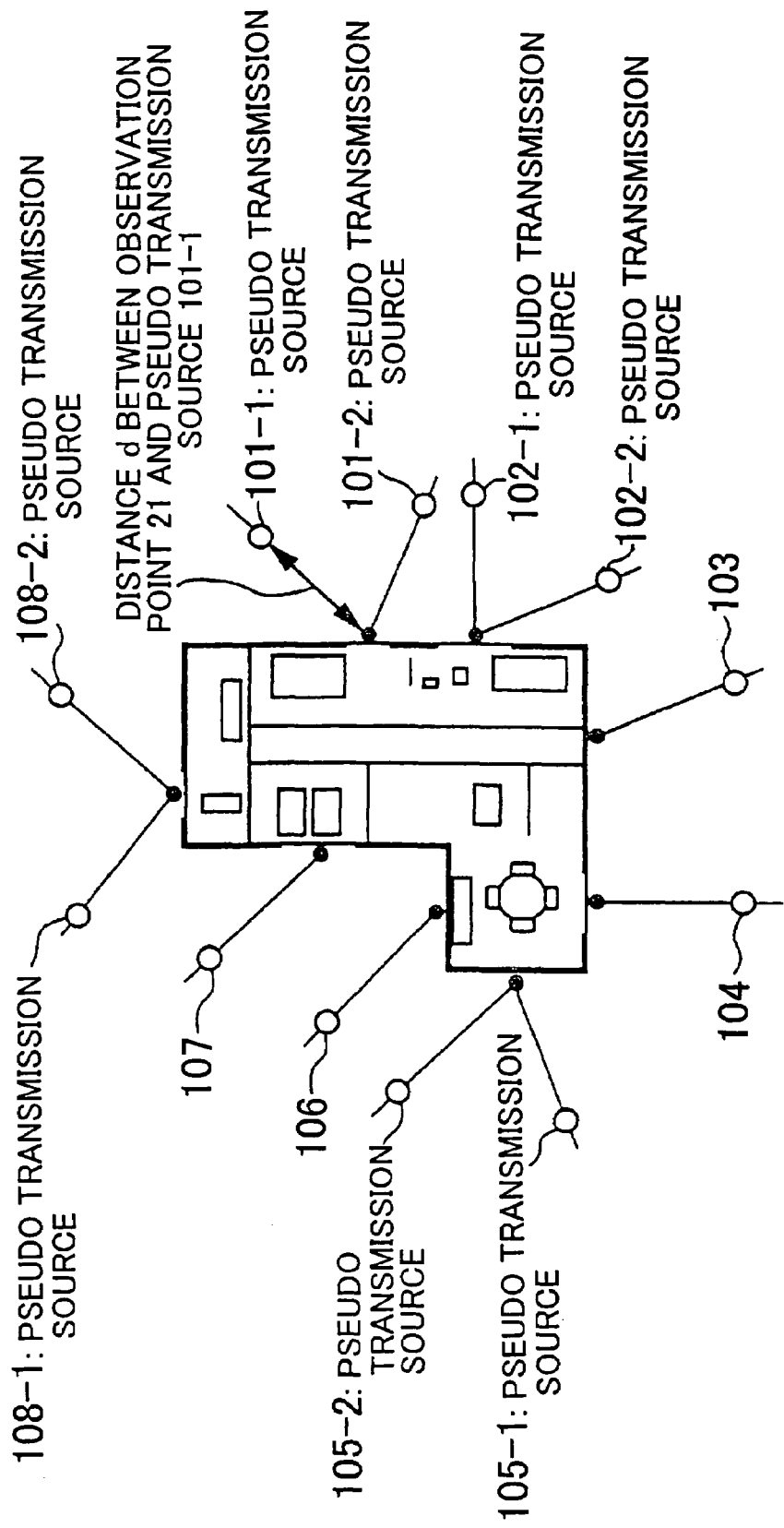

FLOW CHART IN FIFTH EXAMPLE

RADIO WAVE PROPAGATION CHARACTERISTIC ESTIMATION SYSTEM, AND ITS METHOD AND PROGRAM

RELATED APPLICATIONS

This application is a U.S. national stage application of PCT application PCT/JP2005/004764, filed Mar. 17, 2005, and claims priority to Japanese patent application 2004-075477, filed Mar. 17, 2004.

TECHNICAL FIELD

The present invention relates to a system for estimating the radio wave propagation characteristics. In particular, the present invention relates to a radio wave propagation characteristic estimation system for estimating radio wave propagation characteristics in an investigation object area in a part of a coverage area of a wireless system which becomes the object of estimation when the coverage area is wide.

BACKGROUND ART

A radio wave propagation characteristic estimation system (radio wave propagation simulator) is used to support the disposition of the base stations and parent machines in a wireless communication system. Using this radio wave simulator, received power at an arbitrary receiving point and delay spread are evaluated and suitable installation places of transmission stations are determined. As a result, efficiency improvement, such as reduction in the number of base stations to be disposed, is achieved.

Radio wave propagation simulations are broadly classified into those using a statistical technique and those using a decision theoretical technique. In the statistical technique, an estimation expression for propagation loss having the distance and frequency as arguments is given. Parameters are determined by the multivariate analysis on the basis of a large number of data obtained by actual measurements of the propagation loss. In general, propagation of radio waves is varied from section to section by reflection or transmission caused by structures or indoor objects. According to the statistical technique, the median of section variation is given.

On the other hand, the decision theoretical technique is a technique of regarding radio waves emitted from an antenna is regarded as a collection of a large number of radio wave rays, supposing each ray to be repeated in reflection and transmission and propagated, and combining rays arriving at an observation point to find the propagation loss and the delay quantity. The present technique is called ray tracing method. In the ray tracing method, influences of reflection, transmission and diffraction caused by actual structures are taken into consideration, and consequently the section variation itself at the observation point can be known.

The ray tracing methods are further broadly divided into the ray launching method and the imaging method. The ray launching technique is a technique of emitting rays discretely at constant angle intervals, successively tracing their trajectories, and regarding rays passing through near the receiving point as rays that have arrived at the receiving point.

On the other hand, the imaging method is a technique of determining reflection and transmission paths of rays coupling the transmitting point and the receiving point to each other by finding a mirror reflection point for the reflecting surface. If the transmitting and receiving points and the reflecting and transmitting objects are specified, the reflection and transmission paths are uniquely found. In the imaging method, therefore, strict ray propagation paths can be searched for. Details of the ray launching method and the imaging method are disclosed in, for example, Patent reference 1.

Patent Reference 1: JP, H9-33584, A

DISCLOSURE OF INVENTION

Problem to be Solved by the Invention

On the other hand, as the portable telephone spreads in recent years, it has become important to grasp the radio wave propagation situation in a cellular system. In particular, recently a service form of using the same terminal as a portable telephone terminal connected to an ordinary public line as an extension telephone in an enterprise is being studied. In such situations, it becomes necessary to accurately grasp the degree to which radio waves from an outdoor base station leak into a certain building in the coverage area. When implementing this by using a radio wave propagation simulator, a technique for estimating the radio wave propagation environment only for an investigation object area in a part of the coverage area of radio waves from the base station with high speed and high precision becomes necessary. However, any of the above-described conventional techniques cannot satisfy this requirement.

Problems of the conventional techniques will now be described with reference to FIGS. 1 to 4. In an area shown in FIG. 1, a large number of structures such as buildings and roads are disposed. Inside each building, a large number of objects such as furniture and utensils are disposed. It is now supposed that an outdoor base station shown in a lower part of FIG. 1 is a transmission source 1 of a wireless system and a building shown in an upper part of FIG. 1 is an investigation object area 2 which becomes an object of propagation estimation. A technique for estimating the radio wave propagation environment in the investigation object area 2 with high speed and high precision will now be described.

FIG. 2 is a conceptional diagram of radio wave estimation using the statistical technique. In this technique, an estimation expression for propagation loss is given on the basis of inclination in topography and a density of buildings and received power in the investigation object area 2 is estimated by using this estimation expression. This technique is a technique for finding the median of the section variation. Thereafter, it is not possible to accurately reflect the influence of walls and indoor objects that are located within or near the investigation object area 2 on radio waves. As a result, it is not possible to estimate the radio wave propagation environment in the investigation object area 2 with high precision.

FIG. 3 is a conceptual diagram of radio wave estimation using the ray launching method. In this method, it is supposed that rays emitted from the transmission source discretely at constant angle intervals are propagated while being repeatedly reflected and transmitted by structures in a geometrical optic manner, and the path is tracked. In this technique, the influence of structures and indoor objects is accurately reflected, and radio wave propagation estimation with high precision is possible. In the case where the area to be analyzed is wide or there are a large number of contents in the area to be analyzed, the calculation time becomes longer. Furthermore, since rays are emitted regardless of the position of the investigation object area 2, calculation for even rays that do not pass through the investigation object area 2 is also conducted.

This results in a problem that a hideous waste occurs in calculation.

FIG. 4 is a conceptual diagram of radio wave propagation estimation using the imaging method. In this technique, a receiving point is previously set and then ray search is conducted, and consequently there is no problem of the wasteful ray calculation mentioned with reference to the ray launching method. However, the imaging method itself is a technique for searching all combinations of all contents at reflection surfaces and diffraction points for rays arriving at the receiving point. If the reflection surfaces and diffraction points of the contents have increased, therefore, there is a drawback that the amount of calculation exponentially increases. Furthermore, it is necessary to search for rays every receiving point. If the investigation object area 2 is wide to some degree, therefore, a further longer calculation time is needed. As a result, the calculation time becomes extensive, and fast propagation estimation cannot be implemented, either.

An object of the present invention is to provide a radio wave characteristic estimation system and its method and program for estimating radio wave propagation characteristics in an investigation object area in a part of a coverage area of a wireless system, which becomes an object of the estimation, at high speed and with high precision, when the coverage area is wide.

Means for Solving the Problem

A radio wave propagation characteristic estimation system according to the present invention is a radio wave propagation characteristic estimation system for estimating a radio wave propagation environment in an investigation object area, the radio wave propagation characteristic estimation system being provided, in a three-dimensional area including a plurality of contents, with a transmission source and the investigation object area to be investigated as to the propagation environment of radio waves emitted from the transmission source, the radio wave propagation characteristic estimation system including a first unit for finding general radio wave propagation situation within the investigation object area or in vicinity thereof, a second unit for preparing finite pseudo transmission sources to simulate the general radio wave propagation situation, and a third unit for conducting detailed radio wave propagation estimation by designating the finite pseudo transmission sources as new transmission sources and designating an analysis area including the investigation object area as an analysis object.

A radio wave propagation characteristic estimation method according to the present invention is a radio wave propagation characteristic estimation method for estimating a radio wave propagation environment in an investigation object area, when, in a three-dimensional area including a plurality of contents, a transmission source and the investigation object area to be investigated as to the propagation environment of radio waves emitted from the transmission source are provided, the radio wave propagation characteristic estimation method including a first step of finding general radio wave propagation situation within the investigation object area or in vicinity thereof, a second step of preparing finite pseudo transmission sources to simulate the general radio wave propagation situation, and a third step of conducting detailed radio wave propagation estimation by designating the finite pseudo transmission sources as new transmission sources and designating an analysis area including the investigation object area as an analysis object.

A computer program product according to the present invention is a computer program product that, when executed, causes a computer to perform a method for estimating a radio wave propagation environment in an investigation object area, when, in a three-dimensional area including a plurality of contents, a transmission source and the investigation object area to be investigated as to the propagation environment of radio waves emitted from the transmission source are provided, the computer program product including processing for finding general radio wave propagation situation within the investigation object area or in vicinity thereof, processing for preparing finite pseudo transmission sources to simulate the general radio wave propagation situation, and processing for conducting detailed radio wave propagation estimation by designating the finite pseudo transmission sources as new transmission sources and designating an analysis area including the investigation object area as an analysis object.

Function of the present invention will now be described. In a three-dimensional area including a plurality of contents, a transmission source and the investigation object area to be investigated as to the propagation environment of radio waves emitted from the transmission source are provided. When estimating a radio wave propagation environment in the investigation object area, the general radio wave propagation situation within the investigation object area or in the vicinity thereof is found. Finite pseudo transmission sources for simulating the general radio wave propagation situation are prepared. Detailed radio wave propagation estimation is conducted by designating the finite pseudo transmission sources as new transmission sources and designating an analysis area including the investigation object area as an analysis object.

As for the general radio wave propagation situation, the case where received power at an observation point located in the investigation object area or in the vicinity thereof is found, the case where a radio wave arrival direction and received power corresponding to the arrival direction are found, and the case where received power, a radio wave arrival direction and radio wave arrival time for each multi-path component are found can be mentioned. According to the present invention, the pseudo transmission sources are provided with suitable parameters for each of the cases.

When conducting detailed radio wave propagation estimation, it is desirable to conduct radio wave propagation estimation on the analysis area by using the ray tracing method. By using the ray tracing method, contents in the investigation object area or in the vicinity of the investigation object area are taken into consideration suitably and high precision radio wave propagation estimation can be conducted. As for a technique for finding the general radio wave propagation situation, various techniques such as the statistical technique, the ray tracing method, and the actual measurement can be applied. For example, if the arrival range of radio waves from the transmission source is wide and there are a large number of contents in the range, it is desirable to use the statistical technique requiring shorter calculation time.

On the other hand, when it is desired to estimate the radio wave propagation environment in the investigation object area with high precision, it is desirable to use the ray tracing. If the actual measurement in the investigation object area or in the vicinity of the investigation object area can be conducted easily, the general radio wave propagation situation may also be found by the actual measurement.

EFFECT OF THE INVENTION

In a wide cover area of a wireless system, the present invention brings about an effect that the section variation of the radio wave propagation environment can be estimated at high speed and with high precision as regards only an investigation object area that is a part of the cover area.

BRIEF DESCRIPTION OF DRAWINGS

FIG. 24 is a diagram showing disposition of pseudo transmission sources in the fourth example.

DESCRIPTION OF REFERENCE CHARACTERS

10: general radio wave propagation situation acquisition means
20: pseudo transmission source preparation means
30: radio wave propagation estimation means
40: control unit (CPU)
50: memory

BEST MODE FOR CARRYING OUT THE INVENTION

Figure 5:
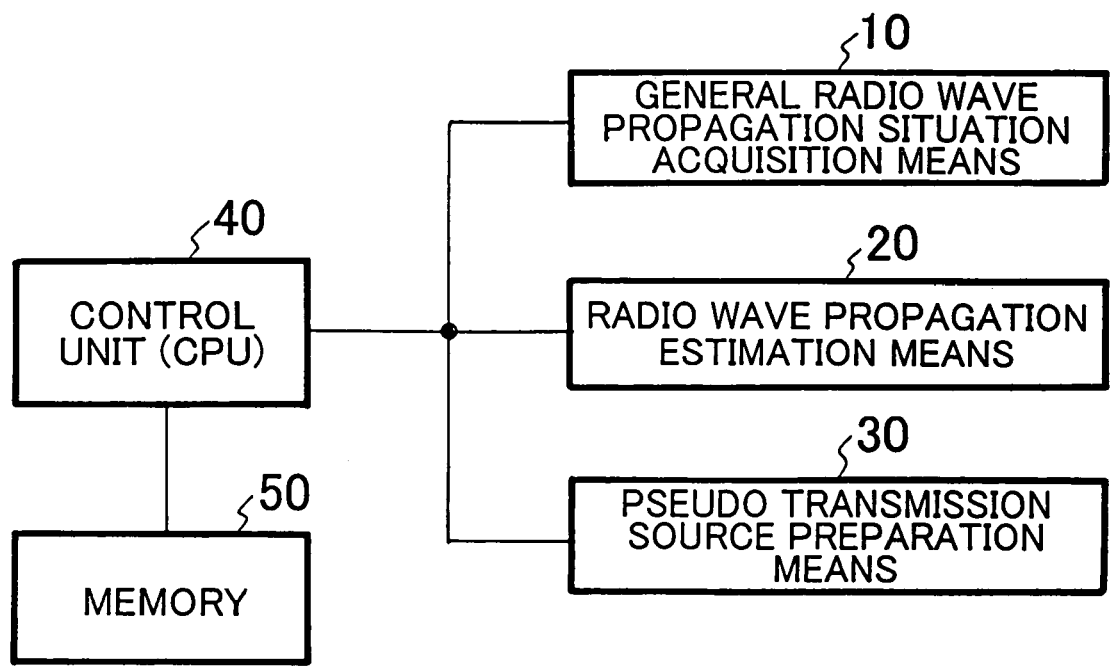
FIG. 5 is a schematic function block diagram in an embodiment according to the present invention.

Hereafter, embodiments according to the present invention will be described with reference to the drawings. FIG. 5 is a functional block diagram showing an outline of an embodiment according to the present invention. A system in the present embodiment is a radio wave propagation characteristic estimation system that is supplied with a transmission source and an investigation object area, which becomes an object of investigation of the propagation environment of radio waves emitted from the transmission source, in a three-dimensional area having a plurality of contents, and that estimates the radio wave propagation environment in the investigation object area. As shown in FIG. 5, the present system includes a general radio wave propagation situation acquisition means 10, a pseudo transmission source preparation means 20, a radio wave propagation estimation means 30, a control unit 40, and a memory 50.

The general radio wave propagation situation acquisition means 10 has a function of finding the general radio wave propagation situation within the investigation object area or in the vicinity thereof. The pseudo transmission source preparation means 20 has a function of preparing finite pseudo transmission sources to simulate the general radio wave propagation situation found by the general radio wave propagation situation acquisition means 10. The radio wave propagation estimation means 30 has a function of conducting detailed radio wave propagation estimation by designating the finite pseudo transmission sources prepared by the pseudo transmission source preparation means 20 as new transmission sources and designating an analysis area including the investigation object area as an analysis object. The control unit 40 is a CPU for controlling these units 10 to 30. The memory 50 functions as a work memory for the CPU, and previously stores an operation procedure of the CPU as a program.

Figure 1:
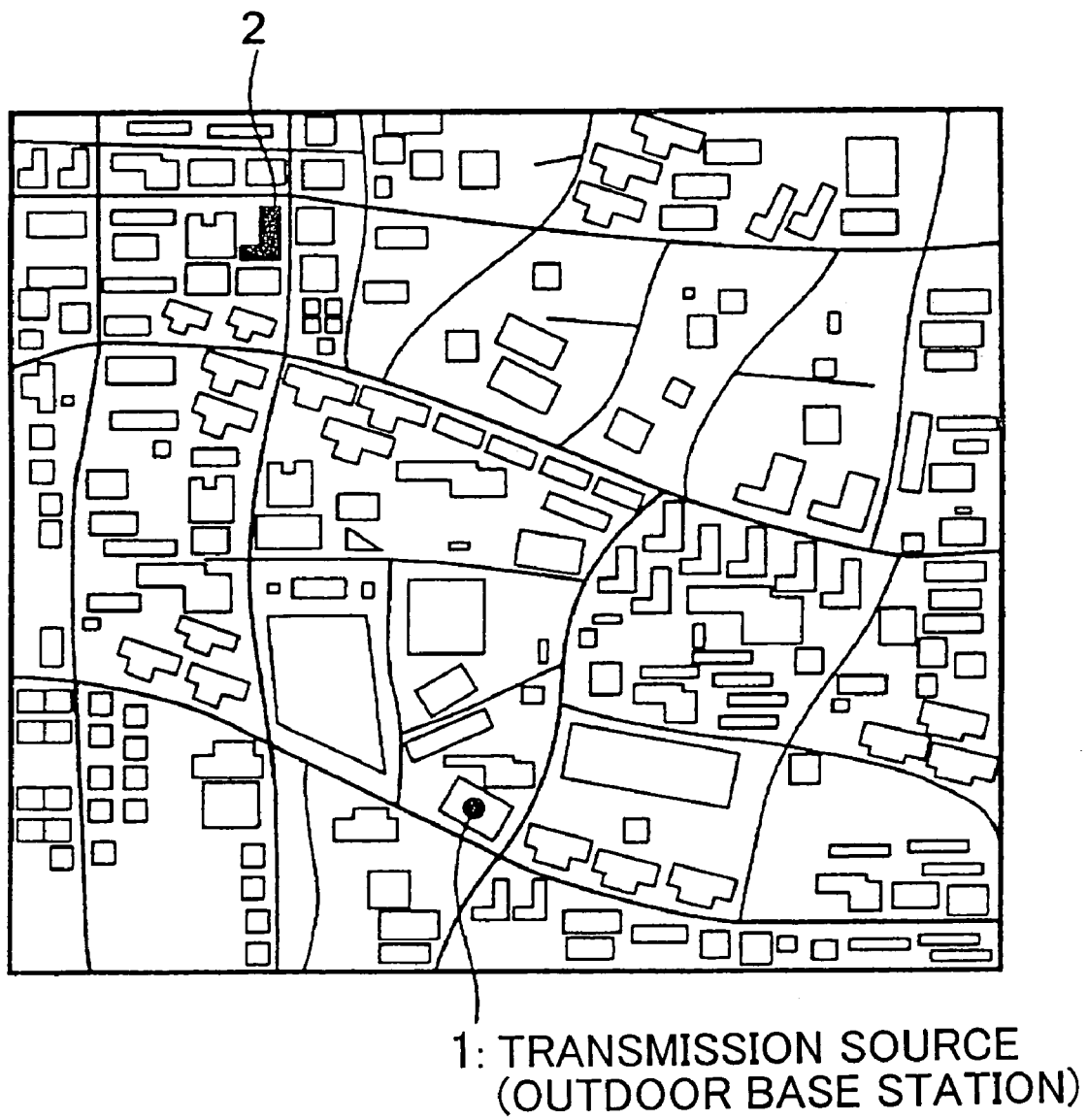
FIG. 1 is a diagram showing a radio wave propagation estimation method.
Figure 2:
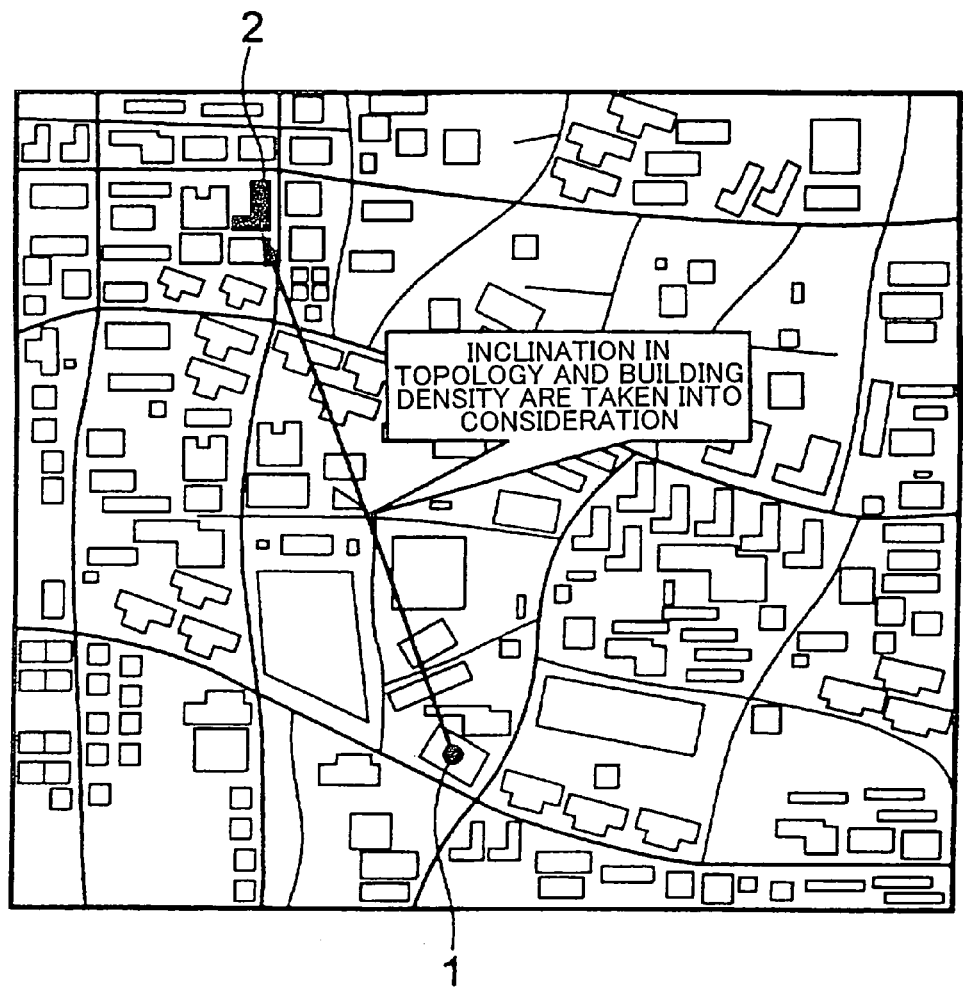
FIG. 2 is a conceptional diagram of radio wave propagation estimation using a statistical technique, which is a conventional technique.
Figure 3:
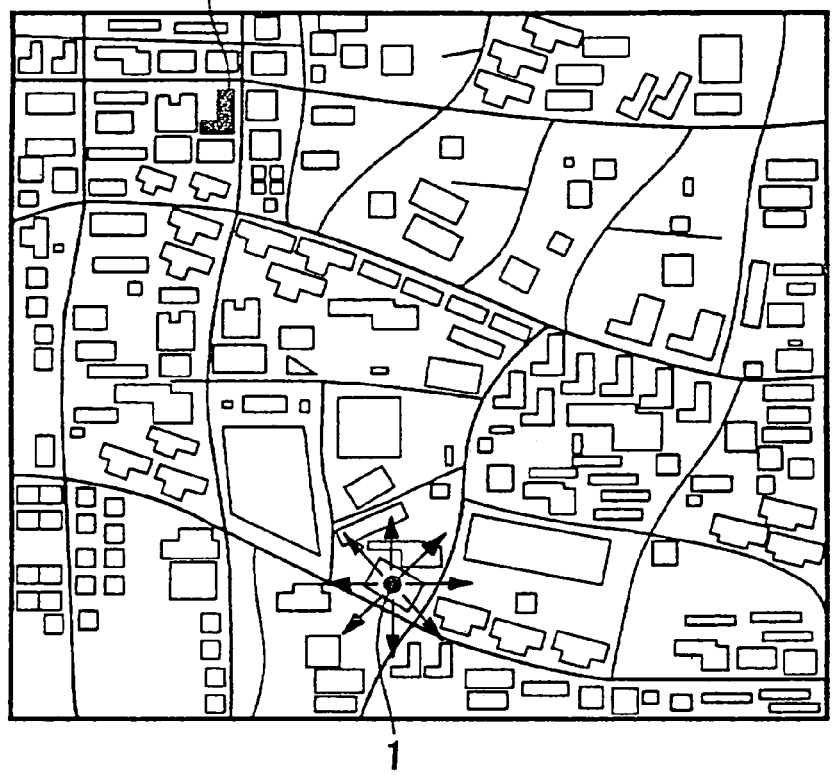
FIG. 3 is a conceptional diagram of radio wave propagation estimation using a ray launching method, which is a conventional technique.
Figure 4:
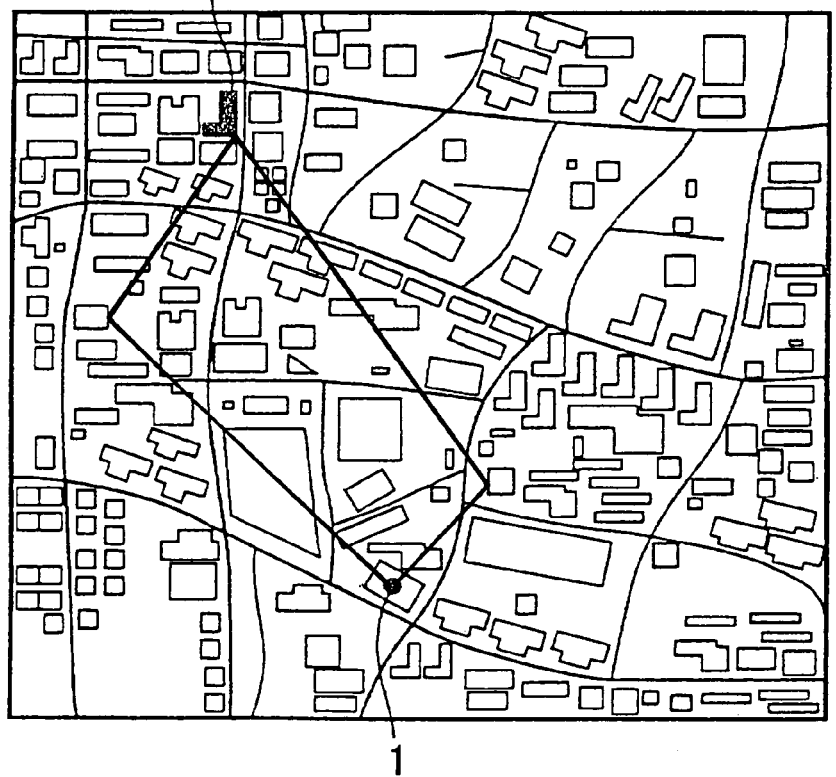
FIG. 4 is a conceptional diagram of radio wave propagation estimation using an imaging method, which is a conventional technique.
Figure 6:
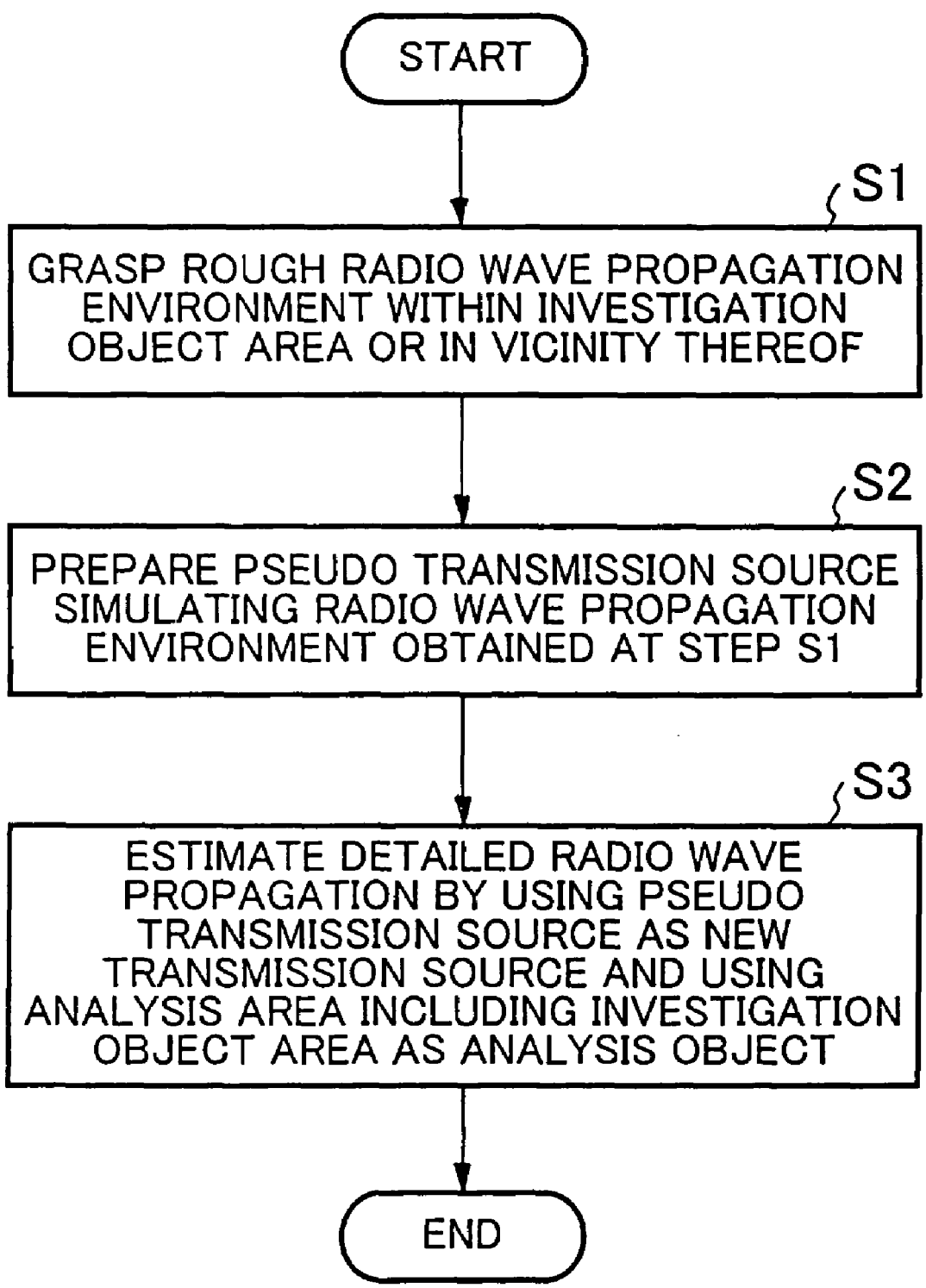
FIG. 6 is a flow chart showing an outline of operation in an embodiment according to the present invention.
Figure 7:
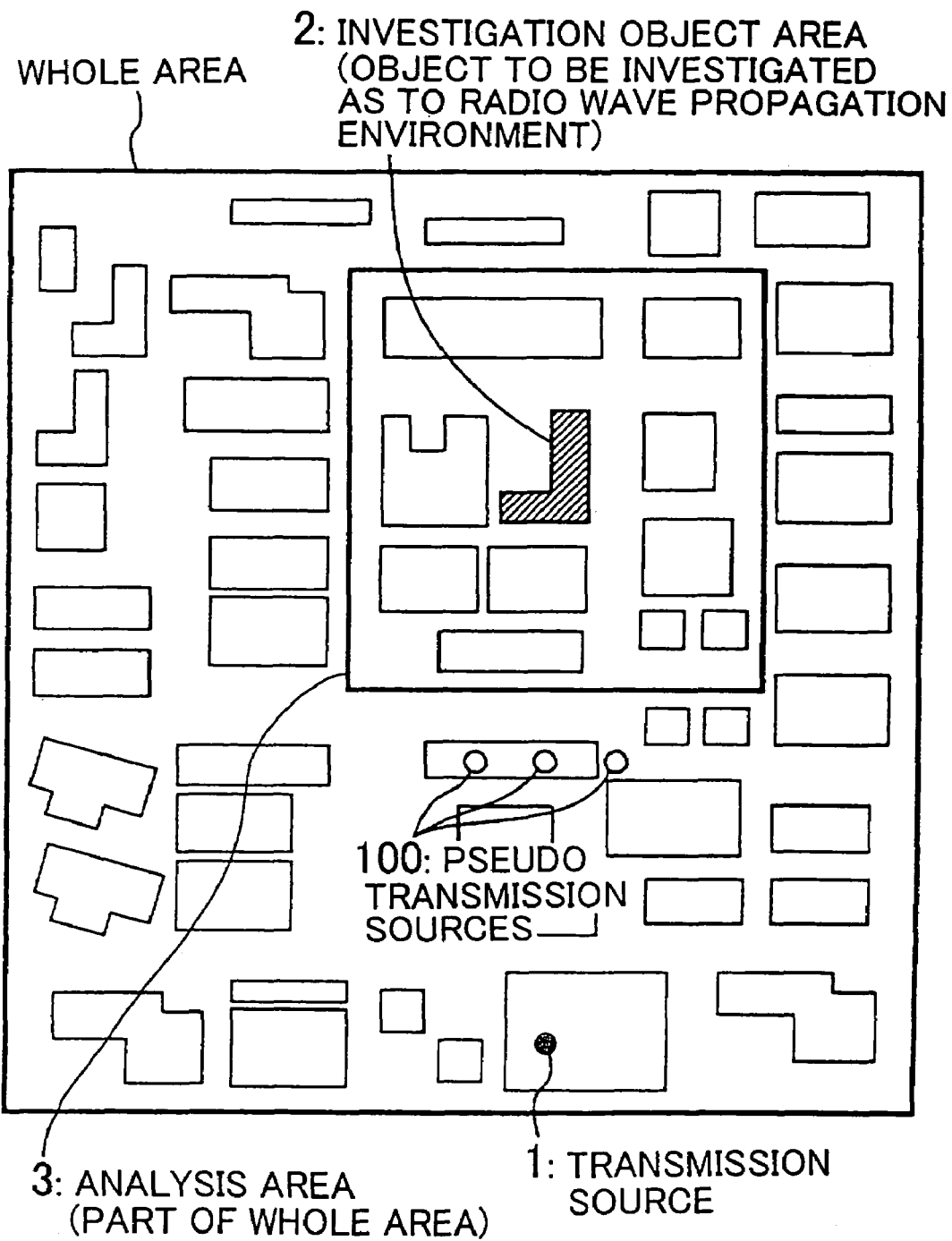
FIG. 7 is a diagram showing operation in an embodiment according to the present invention.

FIG. 6 is a flow chart showing an outline of operation conducted in FIG. 5. FIG. 7 is a diagram showing an outline of the operation. In an area in which a large number of structures such as buildings and roads are disposed as shown in FIG. 1, an outdoor base station is designated as a transmission source 1 of a wireless system, and a building is designated as an investigation object area 2. First, the general radio wave propagation situation acquisition means 10 grasps a rough radio wave propagation environment within the investigation object area 2 or in the vicinity thereof (step S1). For grasping the rough radio wave propagation environment, a technique such as the actual measurement can be used besides the well-known statistical technique and ray tracing method.

Subsequently, the pseudo transmission source preparation means 20 prepares a simulated transmission source for simulating the radio wave propagation environment obtained at the step S1 (step S2). One or more simulated transmission sources 100 (see FIG. 7) are disposed outside the investigation object area as the simulated transmission sources. Thereafter, the radio wave propagation estimation means 30 estimates detailed radio wave propagation by designating the simulated transmission sources 100 as new transmission sources and designating an analysis area 3 including an investigation object area 2 (see FIG. 7) as an analysis object (step S3). In the radio wave propagation estimation at this time, the well-known ray tracing method is used.

Hereafter, embodiments will be described with reference to concrete examples to facilitate understanding.

First Example

Figure 8:
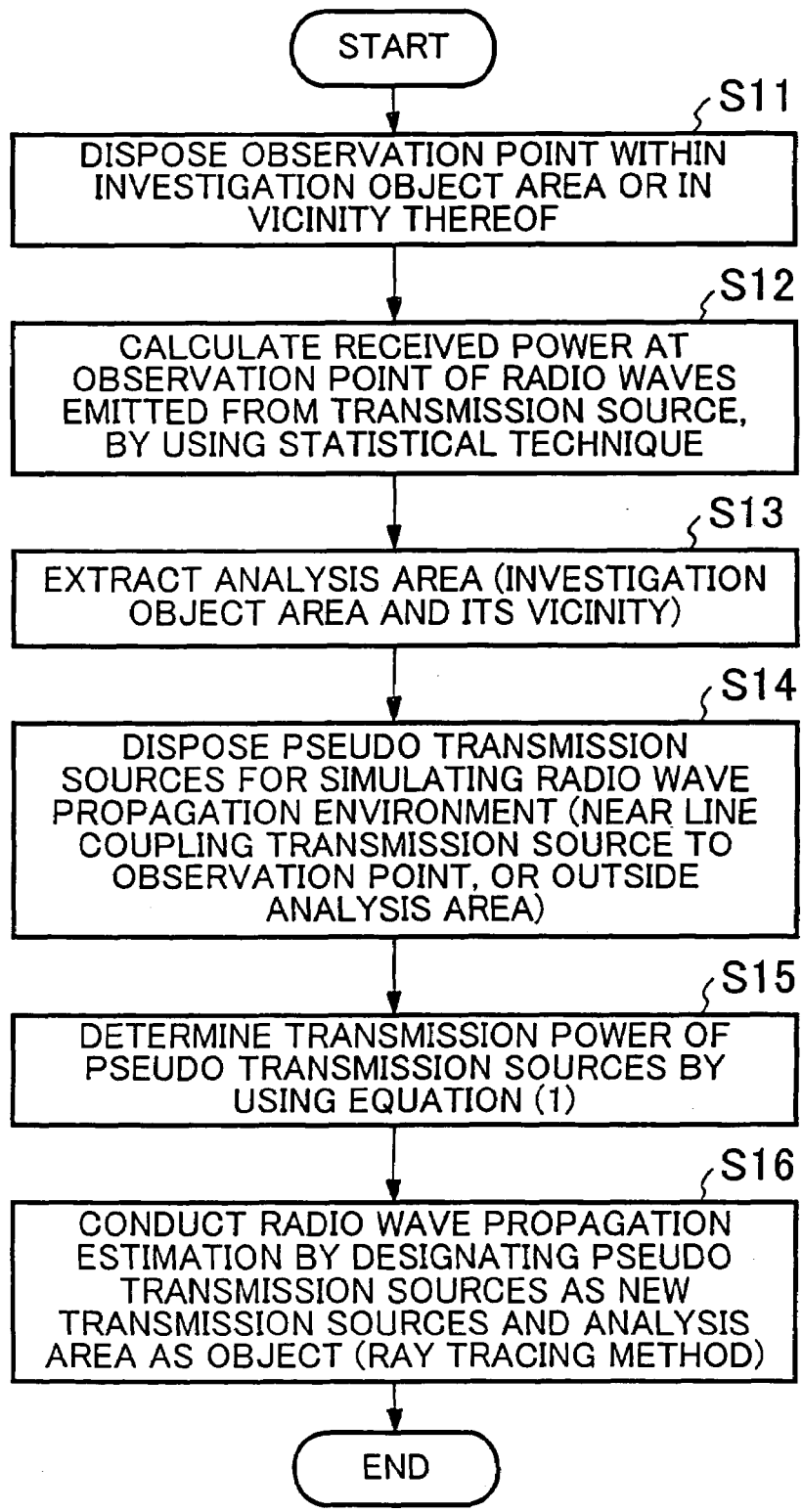
FIG. 8 is a flow chart showing operation in a first example according to the present invention.
Figure 9:
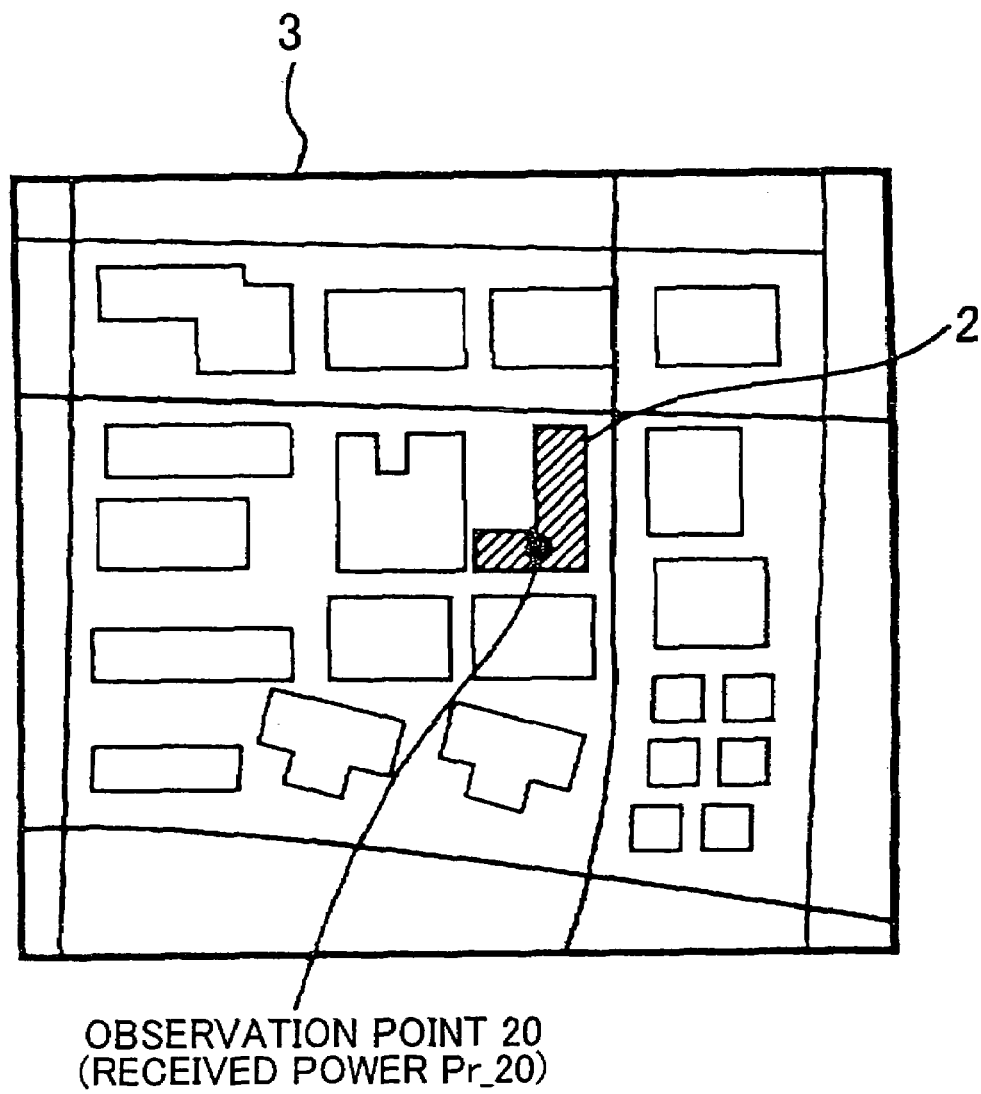
FIG. 9 is a diagram showing extraction of an analysis area and an extracted observation point in the first example.

A first example of the present invention will now be described. The area, and the transmission source and investigation object area in the wireless system supposed in the present example are the same as those shown in FIG. 1. FIG. 8 is a flow chart showing operation in the present example. FIG. 9 shows an analysis area 3 in the present example. An investigation object area 2 is also included within the analysis area 3. An extraction method for the analysis area 3 will be described later.

In the present example, an observation point 20 is first disposed within the investigation object area 2 (step S11). The observation point 20 may be disposed in any position as long as it is within the investigation object or in the vicinity thereof. Subsequently, received power at the observation point 20 of a radio wave emitted from the transmission source 1 is found by using the statistical technique (step S12). The received power found at this time is denoted by Pr_20.

And the analysis area 3 is extracted (step S13). In the present example, the investigation object area 2 and buildings and roads in the vicinity of the investigation object area 2 are extracted together as the analysis area 3. The analysis area becomes an analysis object when conducting detailed radio wave propagation estimation at a later step. How many structures other than the investigation object area are included in the analysis object depends upon the improvement of the estimation precision and the increase of the calculation time. If the number of structures included in the analysis area is large, a long calculation time is required, but the influence of reflection of radio waves caused by buildings is reflected more accurately. In the example shown in FIG. 9, one block including buildings in the vicinity of the investigation object area is adopted as the analysis area 3.

Figure 10:
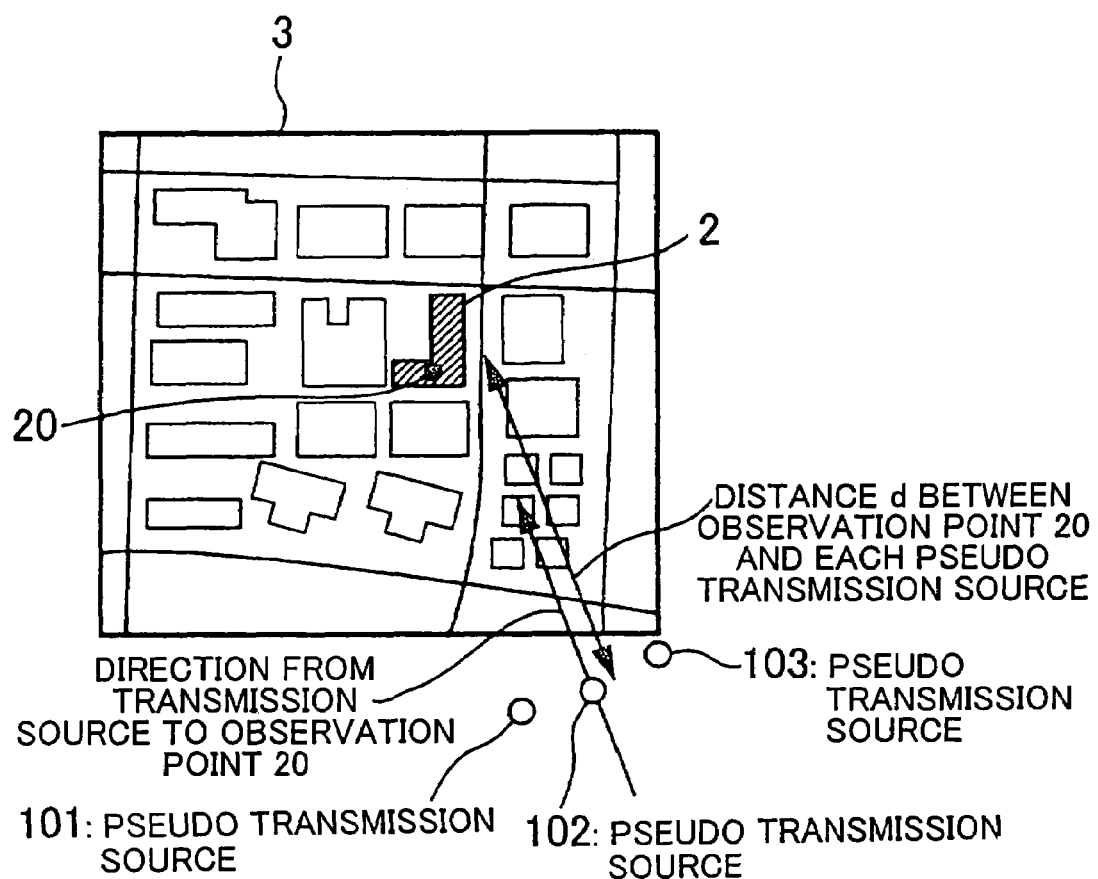
FIG. 10 is a diagram showing disposition of a pseudo transmission source in the first example.

Subsequently, pseudo transmission sources for simulating the radio wave propagation environment found at the step S12 are disposed (step S14). Disposition of pseudo transmission sources 101 to 103 in the present example is shown in FIG. 10. As in the present example, it is desirable to dispose the pseudo transmission sources near a line coupling the transmission source 1 to the observation point 20, considering the arrival direction of radio waves in the case where a free space is supposed. It is desirable to dispose the pseudo transmission sources outside the analysis area 3. On the other hand, as for the number of disposed pseudo transmission sources, a single pseudo transmission source may be disposed or a plurality of pseudo transmission sources may be disposed. If a plurality of pseudo transmission sources are disposed, it is desirable to dispose them so as to make the distances between the pseudo transmission sources and the observation point 20 equal to each other. In the present example, the three pseudo transmission sources 101 to 103 are disposed in positions located at a distance d from the observation point 20.

Subsequently, transmission power of each of the disposed pseudo transmission sources is determined (step S15). Transmission power (Pt_n where n=101, 102, 103) of each of the pseudo transmission sources 101 to 103 is given by the following equation.

$$Pt\_n = Pr\_20 / \{N^* Loss(d)\} \qquad (1)$$

Here, N is the total number of disposed pseudo transmission sources, and N=3 in the present example. Loss(d) is propagation loss in the propagation environment between the observation point 20 and the pseudo transmission sources 101 to 103. The Loss(d) is found by using the statistical technique.

Figure 11:
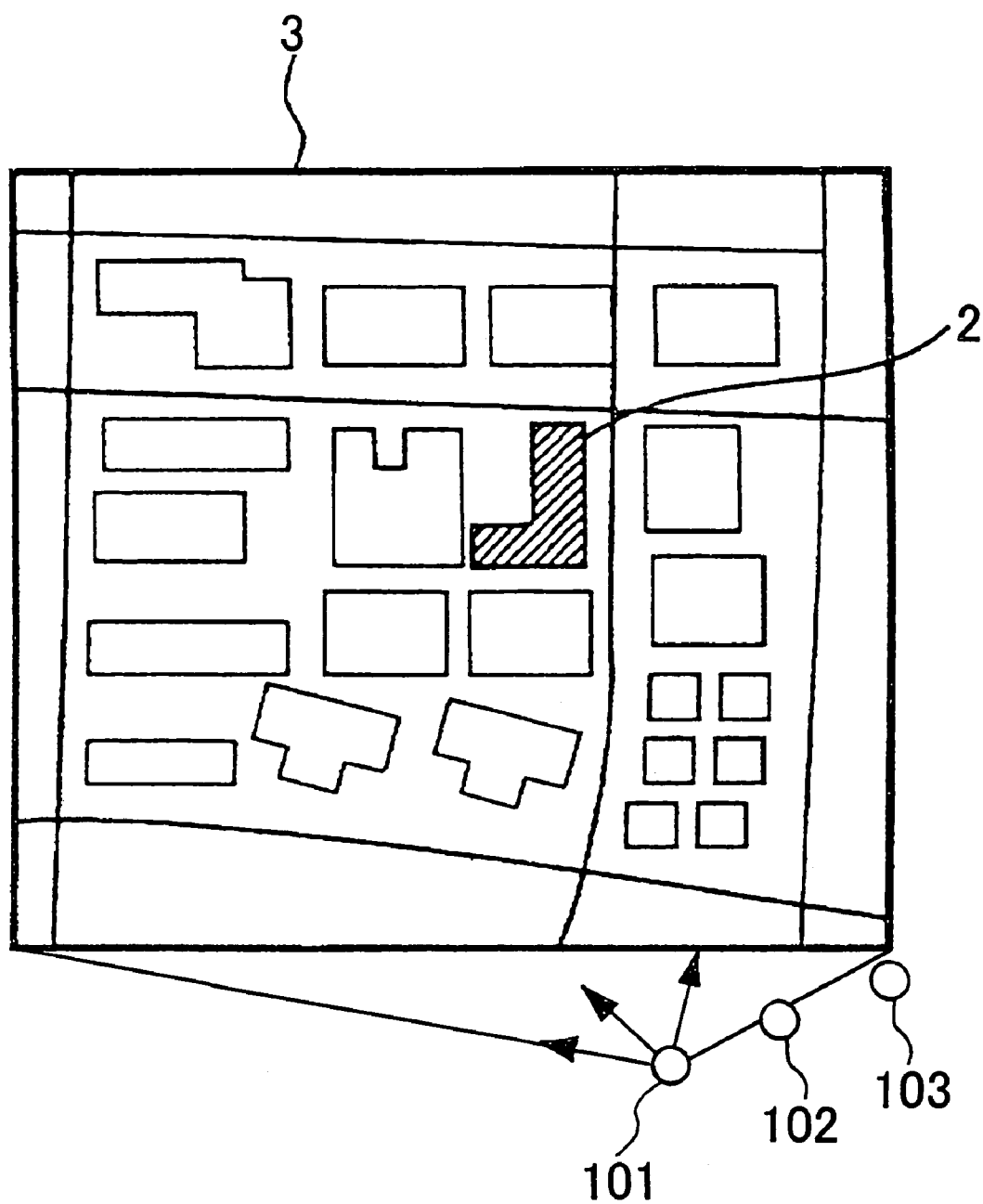
FIG. 11 is a diagram showing radio wave propagation estimation using the ray launching method in the first example.

Subsequently, radio wave propagation estimation is conducted by designating the pseudo transmission sources 101 to 103 disposed at the step S14 as new transmission sources and the analysis area 3 as the object (step S16). FIG. 11 shows a conceptional diagram of radio wave propagation estimation conducted at the step S16. In the present example, the ray launching method, which is one of ray tracing methods, is used to estimate the propagation environment of the investigation object area 2 with high precision. Furthermore, the emission directions of the rays emitted from the pseudo transmission sources 101 to 103 are restricted only in the analysis area 3.

In addition, except the investigation object area 2, objects disposed within buildings are disregarded and only reflections caused by outer walls of buildings are considered. Since objects in buildings other than the investigation object area 2 exert little influence on the radio wave propagation characteristics in the investigation object area 2, fast calculation can be realized without sacrificing the estimation precision. On the other hand, as for the inside of the investigation object area 2, the radio wave propagation estimation is conducted taking layout information within the building as well into consideration. As a result, high precision radio wave propagation estimation with even the walls and indoor objects in the investigation object area 2 considered can be realized at high speed.

Second Example

Figure 12:
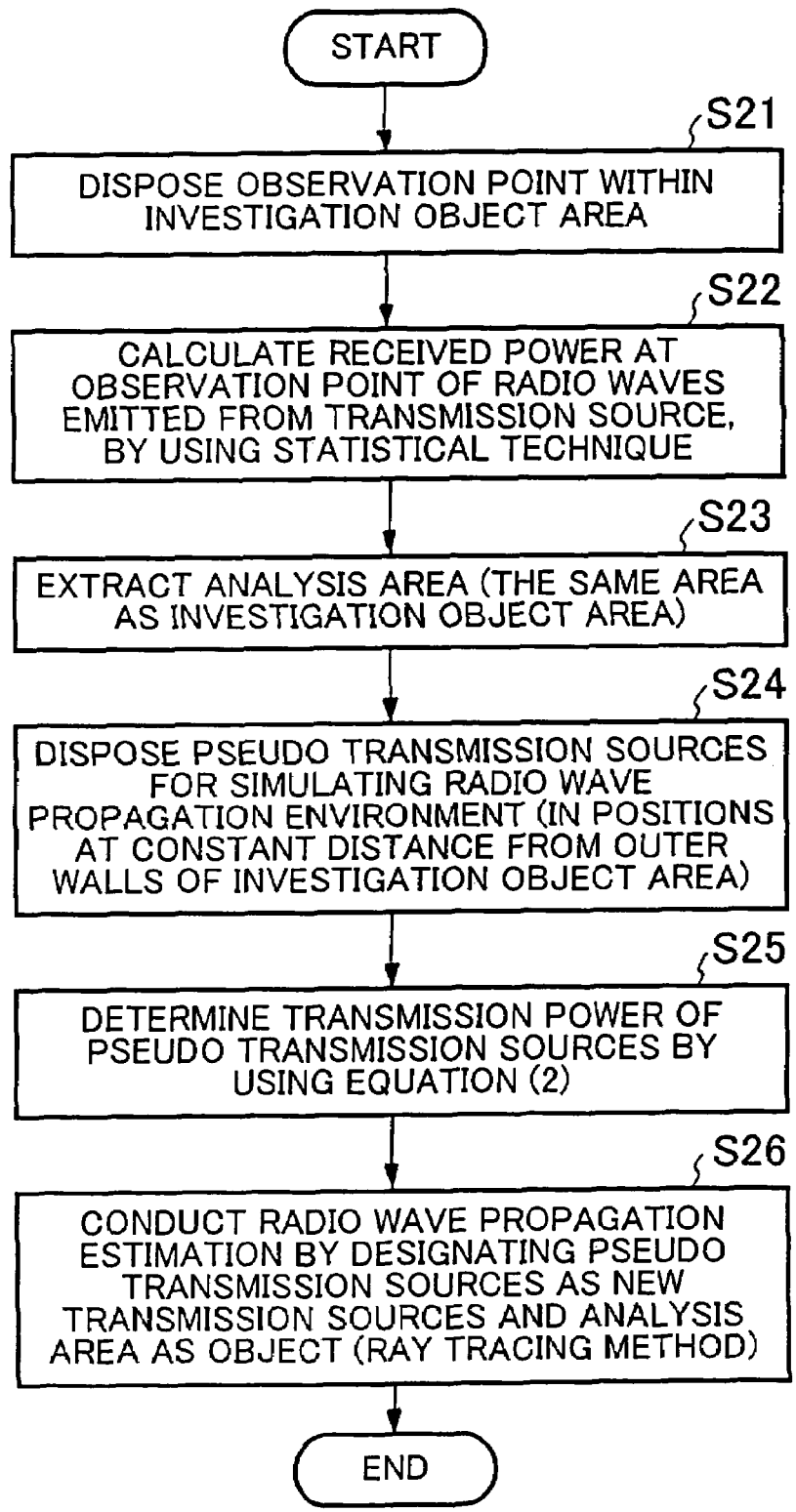
FIG. 12 is a flow chart showing operation in a second example according to the present invention.
Figure 13:
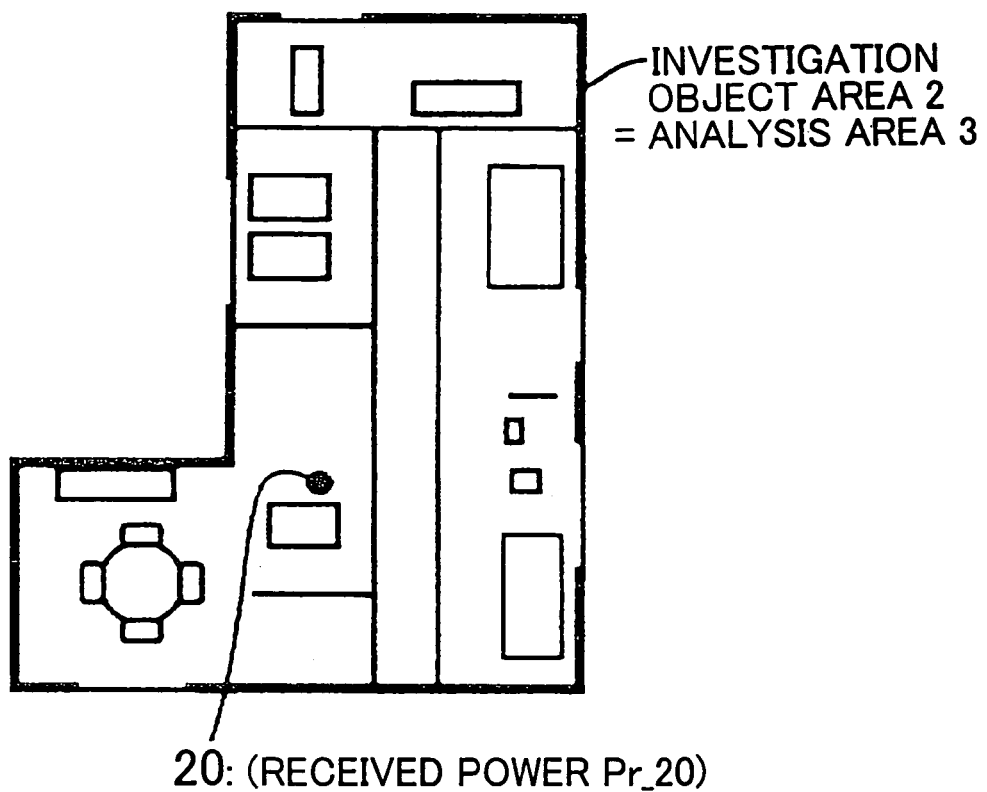
FIG. 13 is a diagram showing extraction of an analysis area and an extracted observation point in the second example.

A second example of the present invention will now be described. The area, and the transmission source and investigation object area in the wireless system supposed in the present example are the same as those shown in FIG. 1. FIG. 12 is a flow chart showing operation in the present example. FIG. 13 shows an analysis area 3 in the present example. In the present example, the analysis area 3 is the same as an investigation object area 2. An extraction method for the analysis area 3 will be described later.

In the present example, steps S21 and S22 are similar to the steps S11 and S12 in the first example. An observation point 20 is disposed within the investigation object area 2, and received power at that position is estimated by using the statistical technique. The received power found at this time is denoted by Pr_20.

Subsequently, the analysis area 3 is extracted (step S23). In the present example, the same area as the investigation object area 2 is extracted as the analysis area 3. By making the analysis area 3 the same as the investigation object area 2 as in the present example, the analysis object in the radio wave propagation estimation at a subsequent step can be restricted to a required minimum, and the calculation time can be shortened. On the other hand, it is necessary to contrive the disposition of pseudo transmission sources and determination of transmission power of each of them in order to properly reflect the effects of reflection and diffraction caused by buildings and roads in the vicinity of the investigation object area 2.

Figure 14:
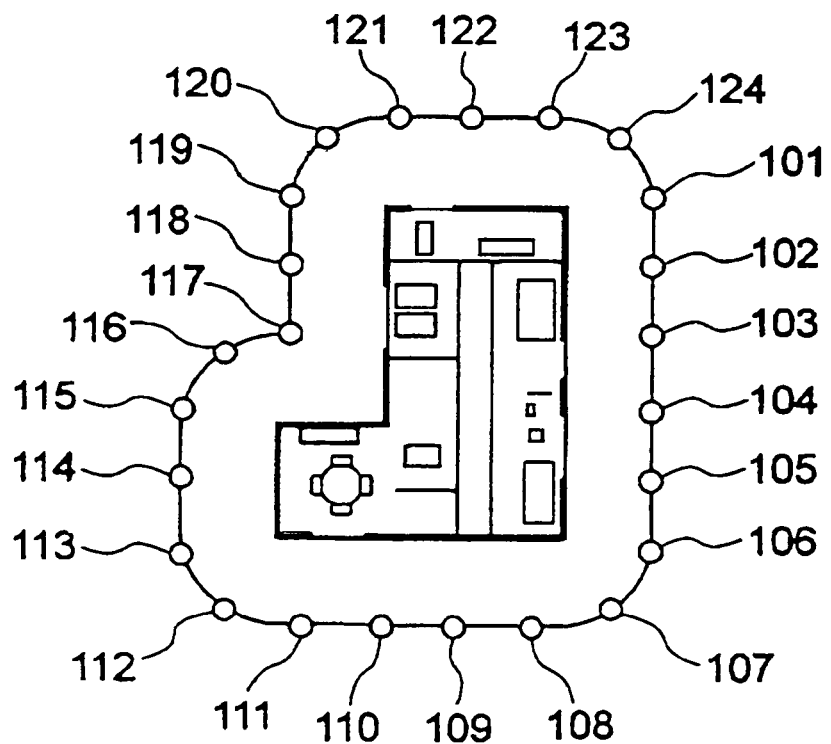
FIG. 14 is a diagram showing disposition of a pseudo transmission source in the second example.

Subsequently, pseudo transmission sources for simulating the radio wave propagation environment found at the step S22 are disposed (step S24). It is desirable to dispose the pseudo transmission sources in positions located at constant distances from outer walls of the investigation object area at this time. FIG. 14 shows disposition of pseudo transmission sources 101 to 124 in the present example.

Subsequently, transmission power of each of the disposed pseudo transmission sources is determined (step S25). Transmission power (Pt_n where n=101 to 104) of each of the pseudo transmission sources 101 to 104 is given by the following equation.

$$Pt\_n = a\_n * Pr\_20 / \{N * \mathrm{Loss}(d)\} \quad (2)$$

Here, the latter half of the right side of the equation (2) is the same as the right side of the equation (1) in the first example. On the other hand, in the present example, a parameter a_n is introduced to provide weights according to the direction of the transmission source 1 and the disposition situation of the peripheral structures. As for a_n, a suitable numerical value is given according to the situation on the basis of a large number of data obtained by actual measurements.

Figure 15:
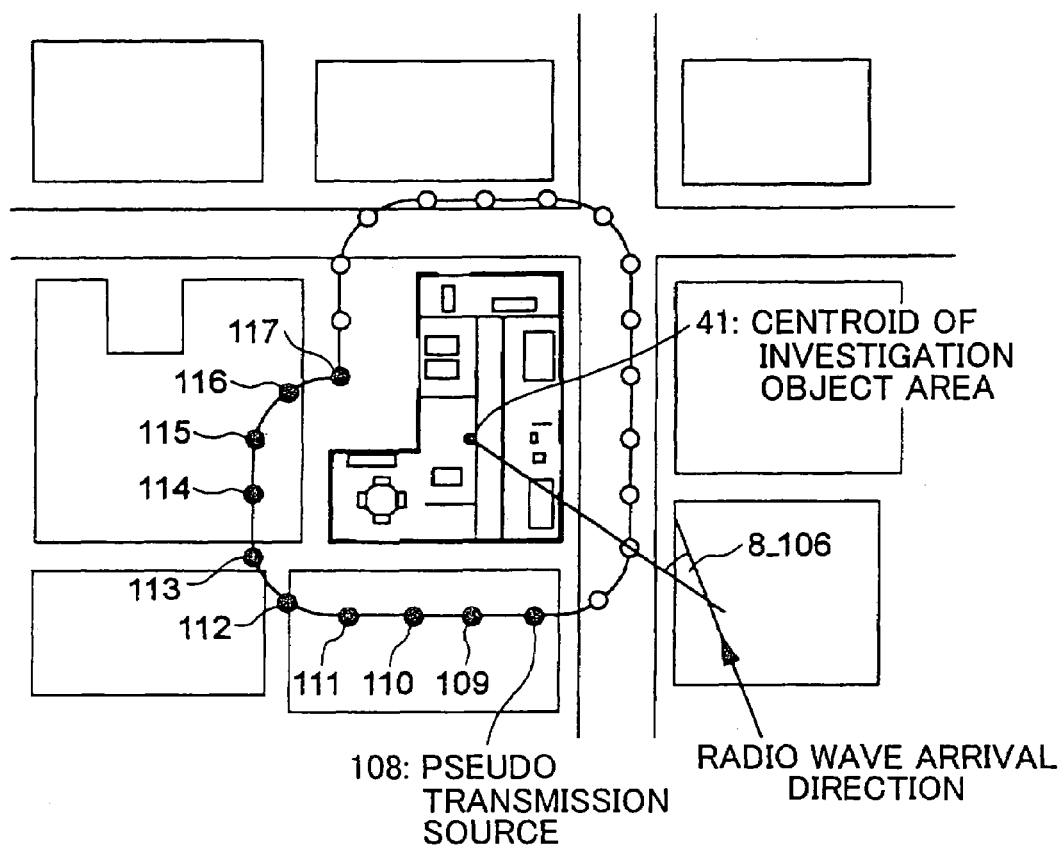
FIG. 15 is a diagram showing determination of transmission power of a pseudo transmission source in the second example.

An example of a method for determining the parameter a_n will now be described with reference to FIG. 15. In general, in the statistical technique for propagation estimation, a road parallel to the direction coupling the transmission source to the observation point and a road perpendicular to the direction coupling the transmission source to the observation point are provided respectively with a longitudinal course correction value K_al [dB] and a lateral course correction value K_ac [dB]. A difference between them is denoted by K. On the other hand, denoting an angle formed between a direction from a centroid 41 of the investigation object area to a pseudo transmission source n and a direction coupling the transmission source and the observation point by θ_n, a_n can be approximated by using the following equation.

$$a\_n = K \cos(\theta\_n) \quad (3)$$

If a structure is adjacent to the investigation object area 2, radio waves from the direction of the structure are blocked by the structure because of the property of the radio wave propagation and it becomes hard for the radio waves to arrive at the investigation object area 2. This is taken into consideration as described below. If there is a structure adjacent to outer walls of the investigation object area 2, loss corresponding to penetration through an adjacent building is calculated by the statistical technique and the loss is added to a_n, with respect to pseudo transmission sources (pseudo transmission sources 108 to 117) that are in the direction of the adjacent structure.

As for the method for determining a_n, several techniques are conceivable besides the above-described techniques. For example, if the investigation object area is distant from the transmission source and there are no buildings that greatly affect the propagation characteristics in the neighborhood of the investigation object area, the arrival direction of a radio wave advancing to the investigation object area can be regarded as constant from any direction. In such a case, simply a_n=1 may be set.

Figure 16:
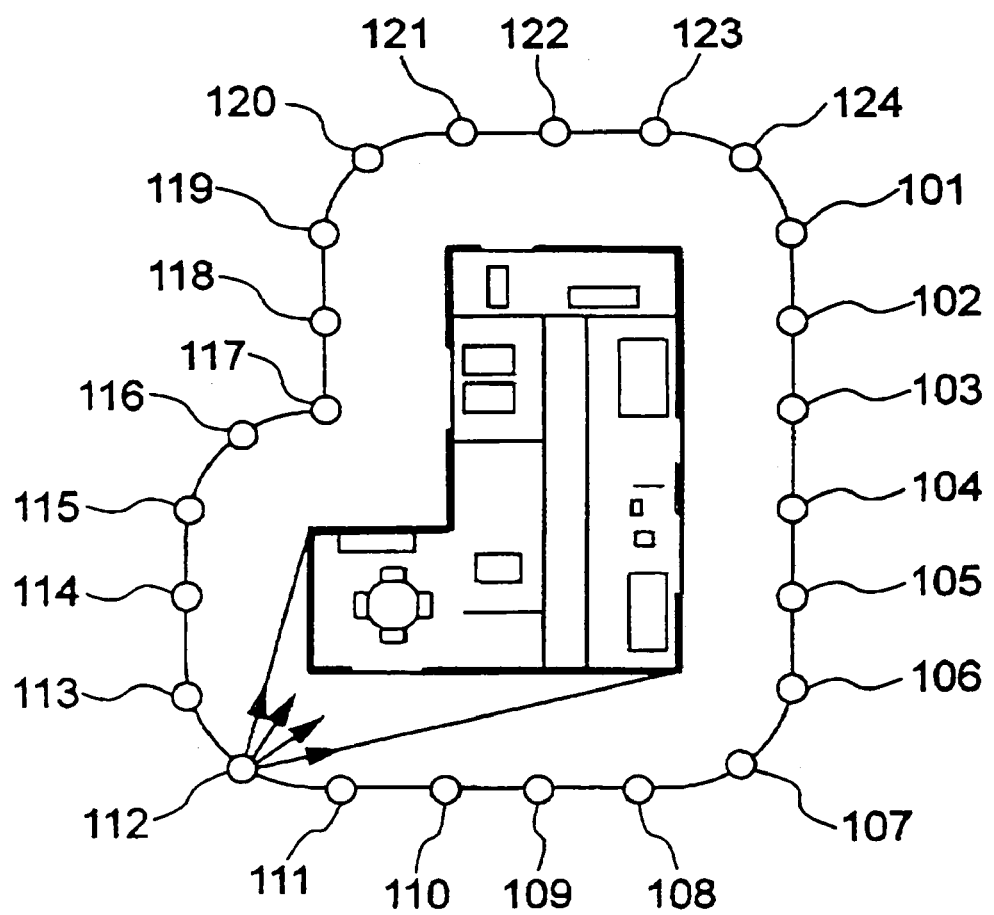
FIG. 16 is a diagram showing radio wave propagation estimation using the ray launching method in the second example.

Subsequently, radio wave propagation estimation is conducted by designating the pseudo transmission sources 101 to 124 disposed at the step S24 as new transmission sources and the analysis area 3 as the object (step S26). FIG. 16 shows a conceptional diagram of radio wave propagation estimation conducted at the step S26. In the present example as well, the ray launching method, which is one of ray tracing methods, is used to estimate the propagation environment of the investigation object area 2 with high precision, in the same way as the first example. Furthermore, the emission directions of the rays emitted from the pseudo transmission sources 101 to 124 are restricted only in the analysis area 3.

On the other hand, by conducting radio wave propagation estimation while taking layout information within the investigation object area 2 as well into consideration, high precision radio wave propagation estimation with even the walls and indoor objects in the investigation object area 2 considered can be realized at high speed.

In the above-described first example and second example, the statistical radio wave estimation method is used when estimating the received power Pr_20 at the observation point 20 at the step S12 and the step S22. Besides this, however, received power at the observation point 20 may be found by an actual measurement.

Third Example

Figure 17:
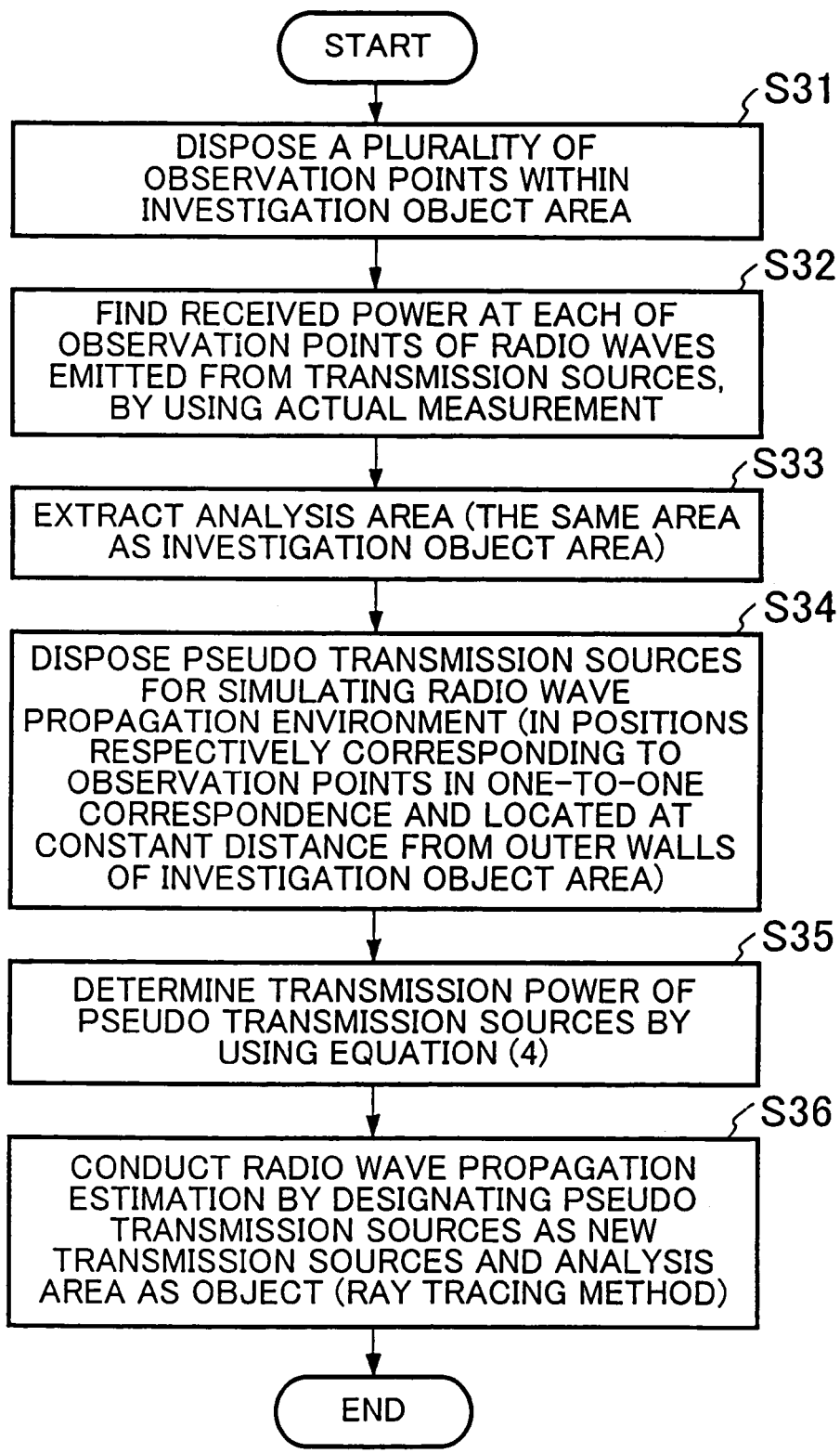
FIG. 17 is a flow chart showing operation in a third example according to the present invention.

A third example of the present invention will now be described. The area, and the transmission source and investigation object area in the wireless system supposed in the present example are the same as those shown in FIG. 1. FIG. 17 is a flow chart showing operation in the present example. In the present example, the analysis area 3 is the same as an investigation object area 2. An extraction method for the analysis area 3 will be described later.

Figure 18:
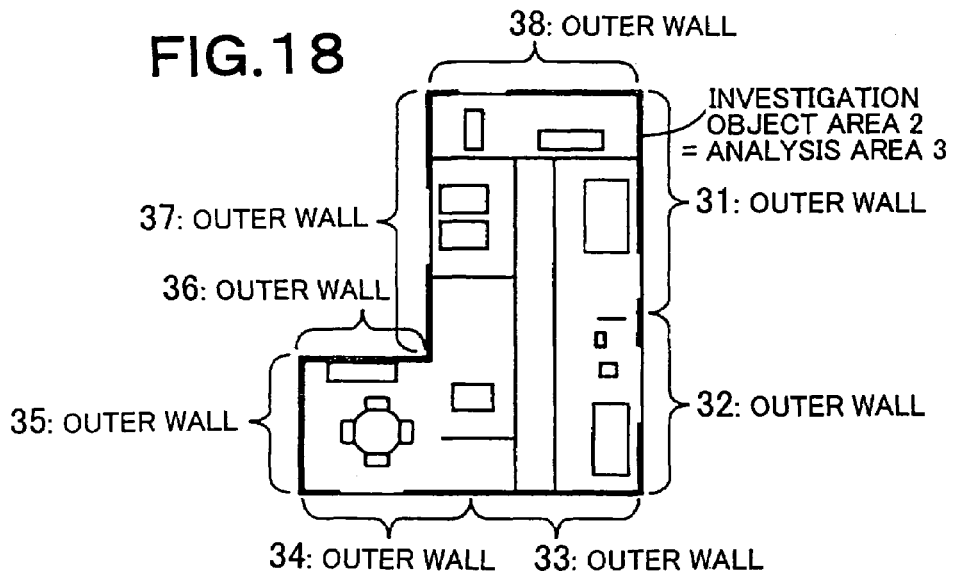
FIG. 18 is a diagram showing an analysis area and outer walls of an investigation object area divided into a plurality of blocks in the third example.
Figure 19:
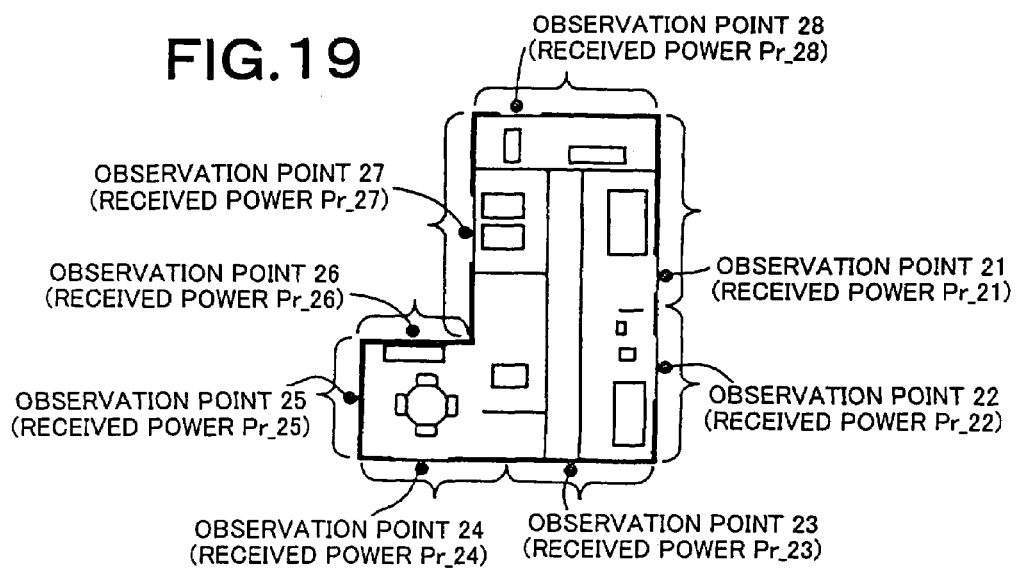
FIG. 19 is a diagram showing extraction of observation points in the third example.

First, a plurality of observation points are extracted in the investigation object area 2 (step S31). A method for extracting a plurality of observation points will now be described. First, as shown in FIG. 18, an outer wall of the investigation object area 2 is divided into a plurality of blocks (outer walls 31 to 38). Subsequently, one observation point is disposed with respect to each of the outer walls obtained by the division. At this time, it is desirable to dispose the observation point in a position having a large transmittance for radio waves, such as a window glass portion, in each outer wall. FIG. 19 shows disposition of observation points 21 to 28 in the present example.

Subsequently, received power at each of observation points 21 to 28 of radio waves emitted from the transmission source 1 is found by an actual measurement (step S32). The received powers found at the observation points 21 to 28 are denoted respectively by Pr_21 to Pr_28.

Figure 20:
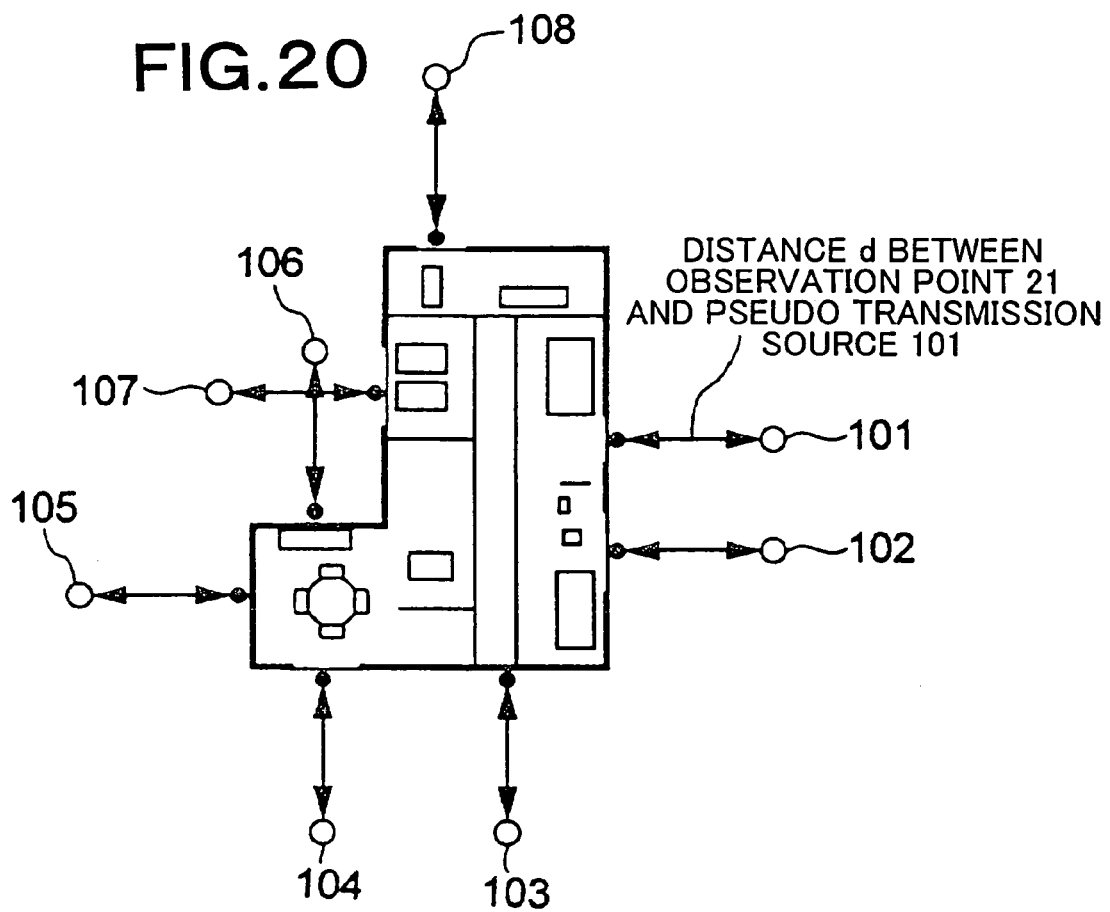
FIG. 20 is a diagram showing disposition of pseudo transmission sources in the third example.

Extraction of an analysis area is conducted in the same way as the second example. The same area as the investigation object area 2 is extracted as the analysis area 3 (step S33). Subsequently, pseudo transmission sources for simulating the radio wave propagation environment found at the step S32 are disposed (step S34). At this time, it is desirable to dispose the pseudo transmission sources so as to associate them respectively with the observation points set at the step S31 in one-to-one correspondence. In addition, it is desirable to dispose the pseudo transmission sources respectively in positions located at a constant distance from the outer walls of the investigation object area. FIG. 20 shows disposition of pseudo transmission sources 101 to 108 in the present example. In the present example, pseudo transmission sources 101 to 108 are disposed in positions located at a constant distance d respectively from the observation points 21 to 28 located on the outer walls of the investigation object area.

Subsequently, transmission power of each of the disposed pseudo transmission sources is determined (step S35). Transmission power (Pt_n where n=101 to 108) of each of the pseudo transmission sources 101 to 108 is given by the following equation.

$$Pt\_n = Pr\_20/\text{Loss}(d) \quad (4)$$

Here, Loss(d) is propagation loss caused over a distance d between the observation points 21 to 28 and respectively corresponding pseudo transmission sources 101 to 108. The Loss(d) is found according to a theoretical propagation loss equation in free space.

Figure 21:
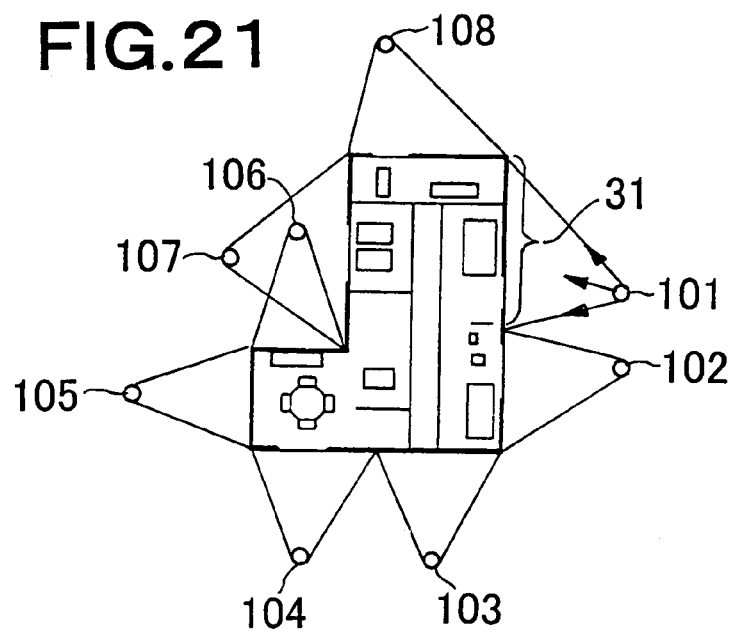
FIG. 21 is a diagram showing radio wave propagation estimation using the ray launching method in the third example.

Radio wave propagation estimation is conducted by designating the pseudo transmission sources 101 to 108 disposed at the step S34 as new transmission sources and the analysis area 3 as the object (step S36). FIG. 21 shows a conceptional diagram of radio wave propagation estimation conducted at the step S36. In the present example as well, the ray launching method, which is one of ray tracing methods, is used to estimate the propagation environment of the investigation object area 2 with high precision in the same way as the pertinent parts in the first example or the second example. The ray emission direction at this time is restricted only to an outer wall represented by an observation point corresponding to each pseudo transmission source. For example, the ray emission direction of the pseudo transmission source 101 is restricted only to the outer wall 31.

Fourth Example

Figure 22:
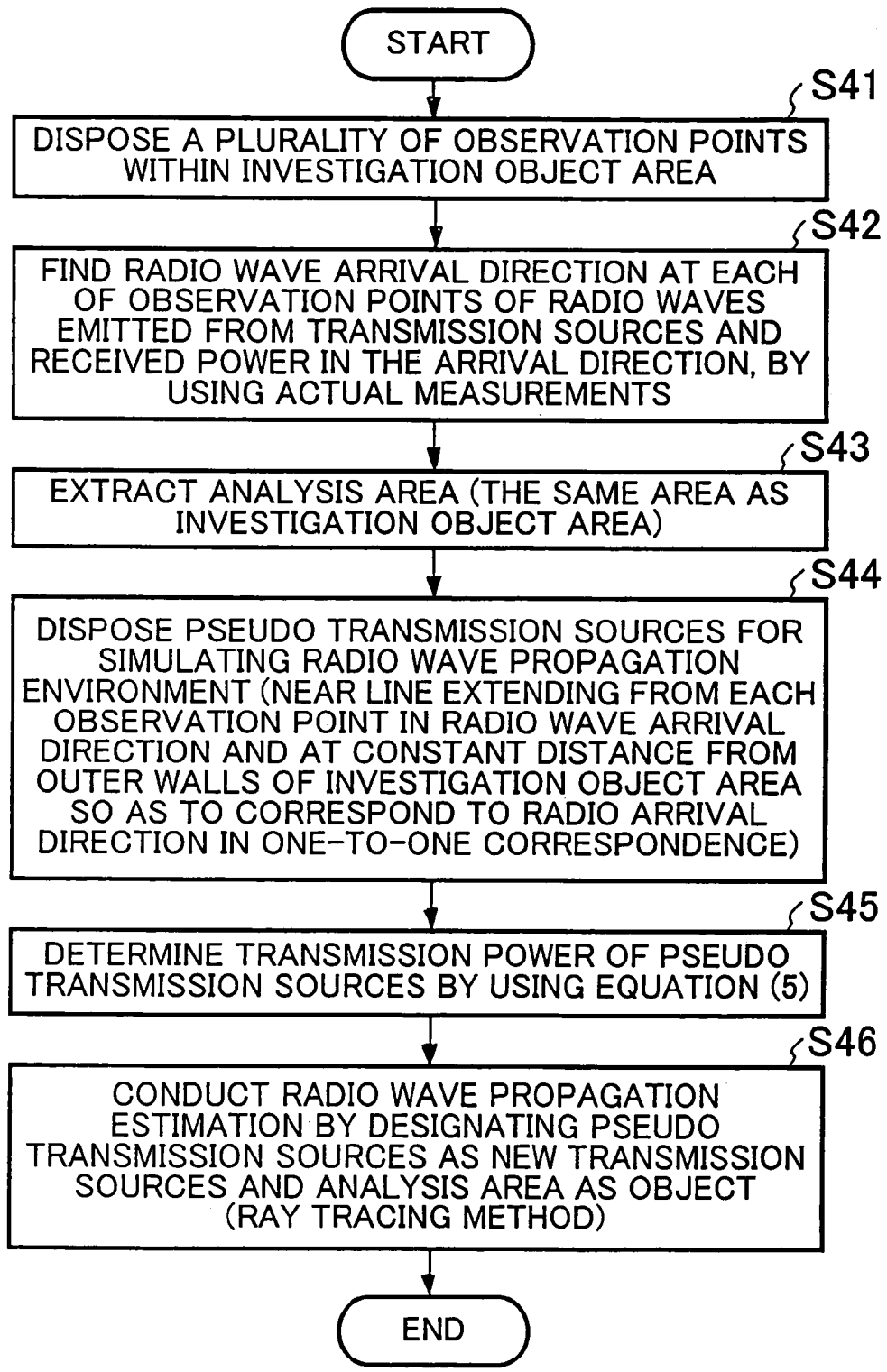
FIG. 22 is a flow chart showing operation in a fourth example according to the present invention.

A fourth example of the present invention will now be described. The area, and the transmission source and investigation object area in the wireless system supposed in the present example are the same as those shown in FIG. 1. FIG. 22 is a flow chart showing operation in the present example. In the present example, the analysis area 3 is the same as an investigation object area 2. An extraction method for the analysis area 3 will be described later.

Figure 23:
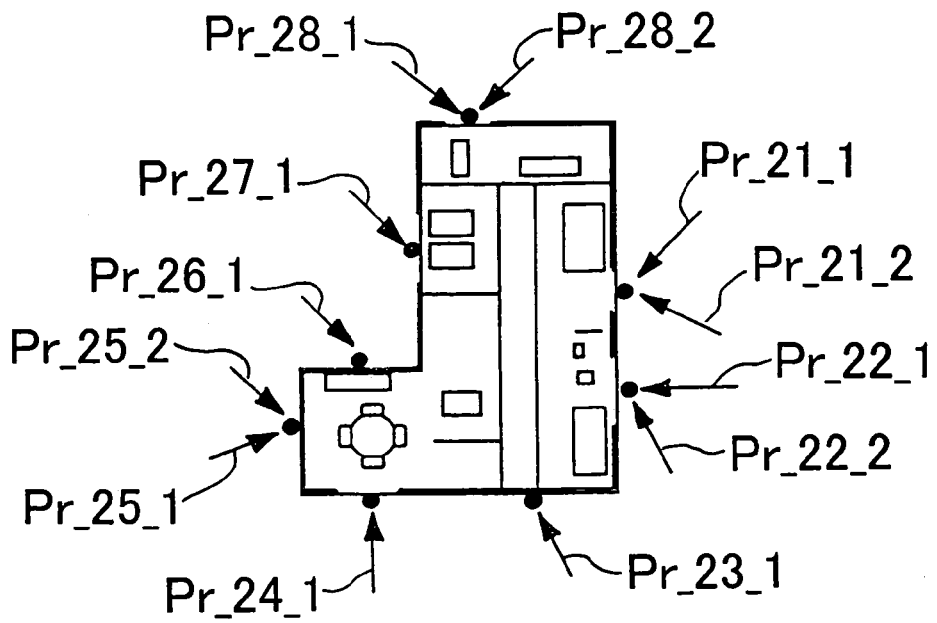
FIG. 23 is a diagram showing extraction of observation points in the fourth example.

Extraction of observation points in the present example is conducted in the same way as in the pertinent portion in the third example. Observation points 21 to 28 are disposed respectively for outer walls 31 to 38 obtained by division (step S41). Subsequently, at each of the observation points 21 to 28, a radio wave arrival direction of a radio wave emitted from the transmission source 1 at each of the observation points 21 to 28 and received power corresponding to the radio wave arrival direction are found by actual measurements (step S42). For measuring up to the radio wave arrival direction, an antenna having strong directivity, such as an array antenna, should be used. In FIG. 23, radio wave arrival directions found at the observation points 21 to 28 are indicated by arrows, and corresponding received power (Pr_21_1 to Pr_28_2) is indicated.

Extraction of an analysis area is conducted in the same way as the second and third examples. The same area as the investigation object area 2 is extracted as the analysis area 3 (step S43). Subsequently, pseudo transmission sources 101-1 to 108-2 for simulating the radio wave propagation environment found at the step S42 are disposed (step S44). At this time, the pseudo transmission sources are disposed so as to be associated respectively with the radio wave propagation directions found at the step S42 and be located on lines extending respectively from the observation points in the radio wave propagation directions. In addition, it is desirable to dispose the pseudo transmission sources respectively in positions located at a constant distance from the outer walls of the investigation object area. FIG. 24 shows disposition of the pseudo transmission sources 101-1 to 108-2 in the present example. By thus disposing the pseudo transmission sources, the radio wave arrival direction to the investigation object can be simulated with high precision.

Subsequently, transmission power of each of the disposed pseudo transmission sources is determined (step S45). Transmission power (Pt_n_m where n=101 to 108 and m=1, 2) of each of the pseudo transmission sources 101-1 to 108-2 is given by the following equation.

$$Pt\_n\_m = Pr\_n\_m/\text{Loss}(d) \quad (5)$$

Here, Loss(d) is propagation loss caused over a distance d between the observation points 21 to 28 and respectively corresponding pseudo transmission sources 101-1 to 108-2. The Loss(d) is found according to a theoretical propagation loss equation in free space.

Figure 25:
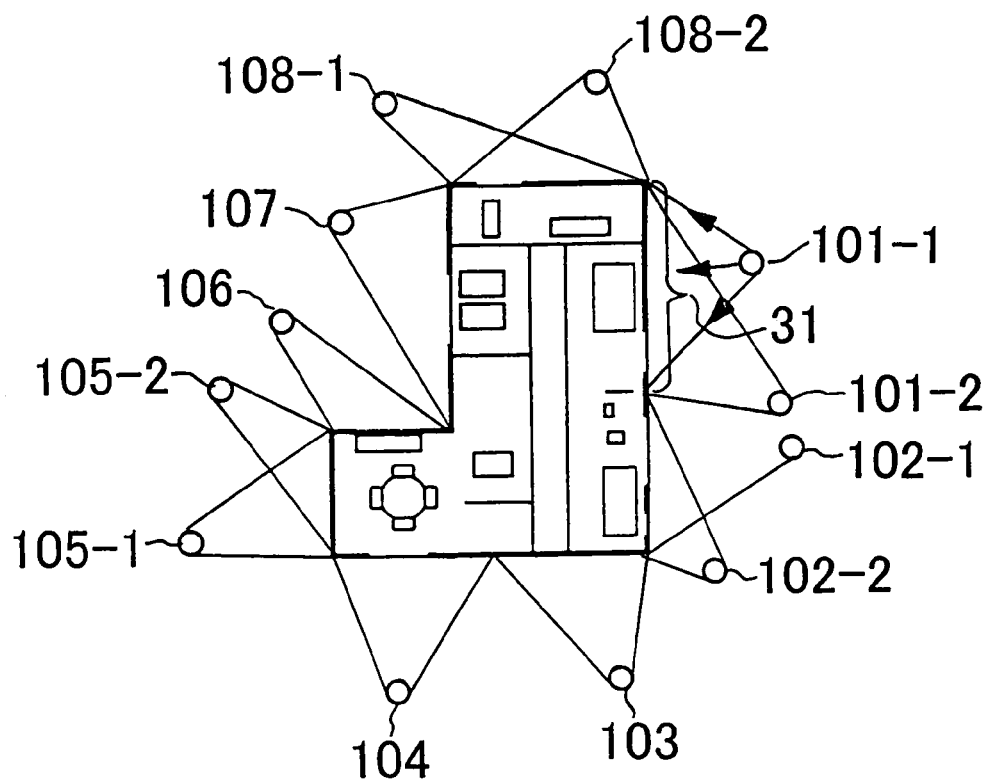
FIG. 25 is a diagram showing radio wave propagation estimation using the ray launching method in the fourth example.

A subsequent step S46 is the same as the step S36 in the third example. Radio wave propagation estimation is conducted by designating the pseudo transmission sources 101-1 to 108-2 as new transmission sources and the analysis area 3 as the object and using the ray launching method. FIG. 25 shows a conceptional diagram of radio wave propagation estimation conducted at the step S46. The ray emission direction at this time is restricted only to an outer wall represented by an observation point corresponding to each pseudo transmission source. For example, the ray emission direction of the pseudo transmission source 101-1 is restricted only to the outer wall 31.

In the third example and the fourth example, actual measurement is used to estimate the received power Pr_21 to Pr_28 of the observation points 21 to 28 at the step S32 and S42. Alternatively, the received power at the observation points 21 to 28 may be found by using the ray tracing method besides the actual measurement.

Fifth Example

Figure 26:
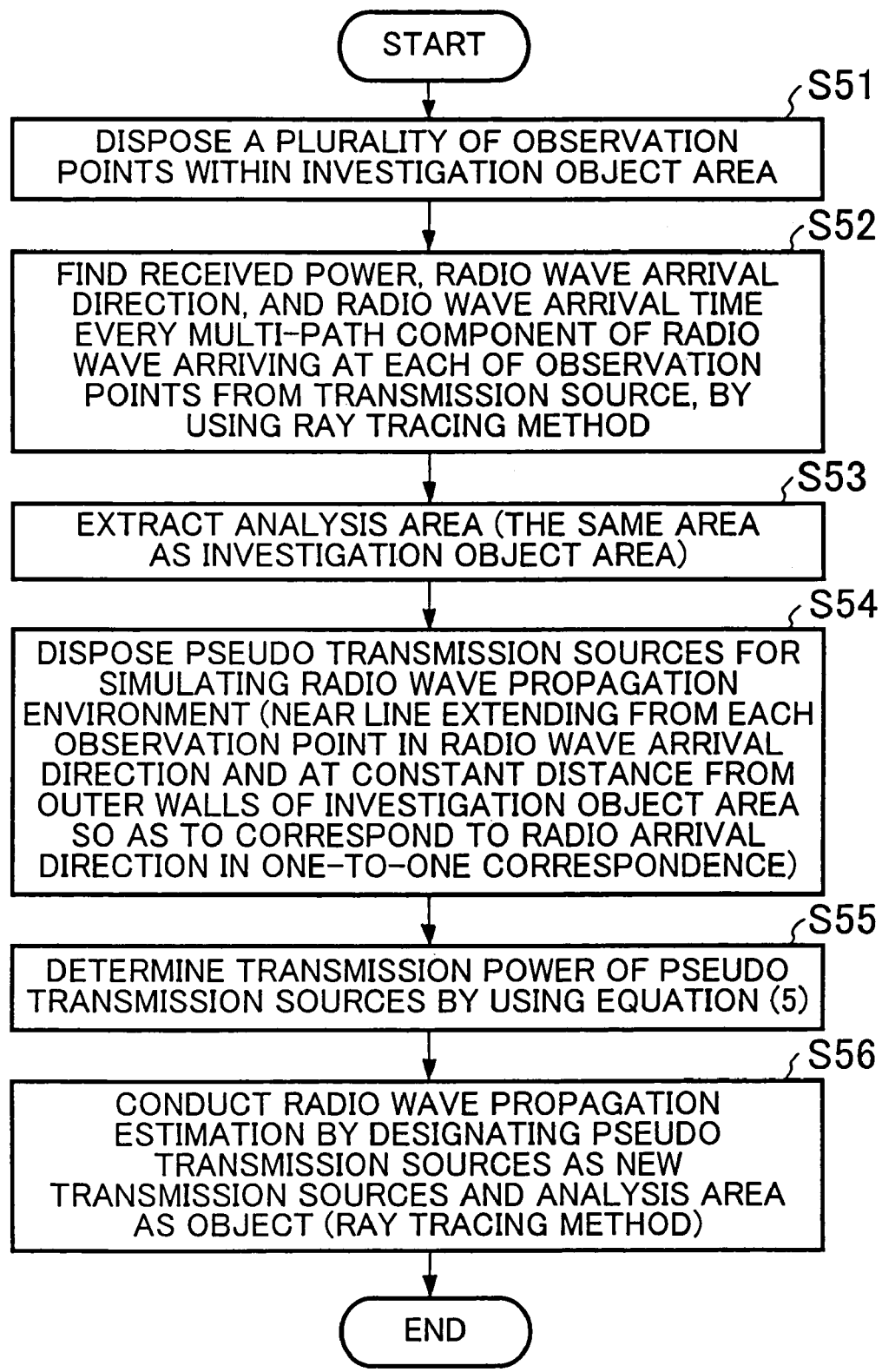
FIG. 26 is a flow chart showing operation in a fifth example according to the present invention.

A fifth example of the present invention will now be described. The area, and the transmission source and investigation object area in the wireless system supposed in the present example are the same as those shown in FIG. 1. FIG. 26 is a flow chart showing operation in the present example. In the present example, the analysis area 3 is the same as an investigation object area 2. An extraction method for the analysis area 3 will be described later.

Extraction of observation points at step S51 in the present example is conducted in the same way as that at the steps S31 and S41 in the third and fourth examples. Observation points 21 to 28 are disposed respectively for outer walls 31 to 38 obtained by division. Subsequently, at each of the observation points 21 to 28, the received power, the radio wave arrival direction, and the radio wave arrival time are found every multi-path component of radio waves arriving at the observation points 21 to 28 from the transmission source 1, by using the imaging method, which is one kind of the ray tracing methods (step S52).

Figure 27:
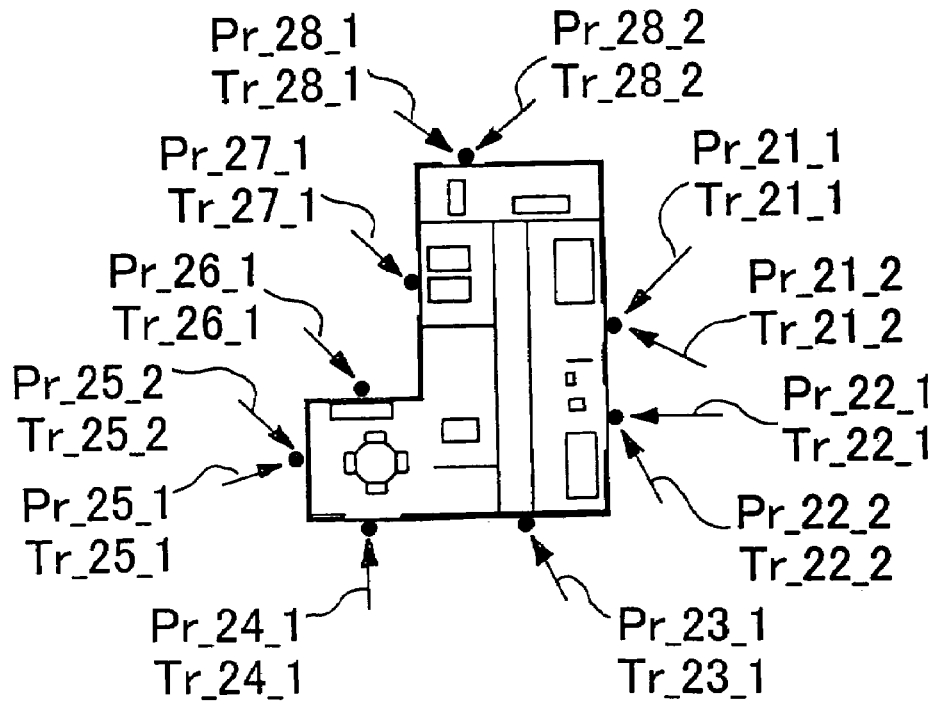
FIG. 27 is a diagram showing extraction of observation points in the fifth example.

In FIG. 27, radio wave arrival directions found at the observation points 21 to 28 are indicated by arrows, and corresponding received power (Pr_21_1 to Pr_28_2) and radio wave arrival time (Tr_101_1 to Tr_108_2) are indicated.

Figure 28:
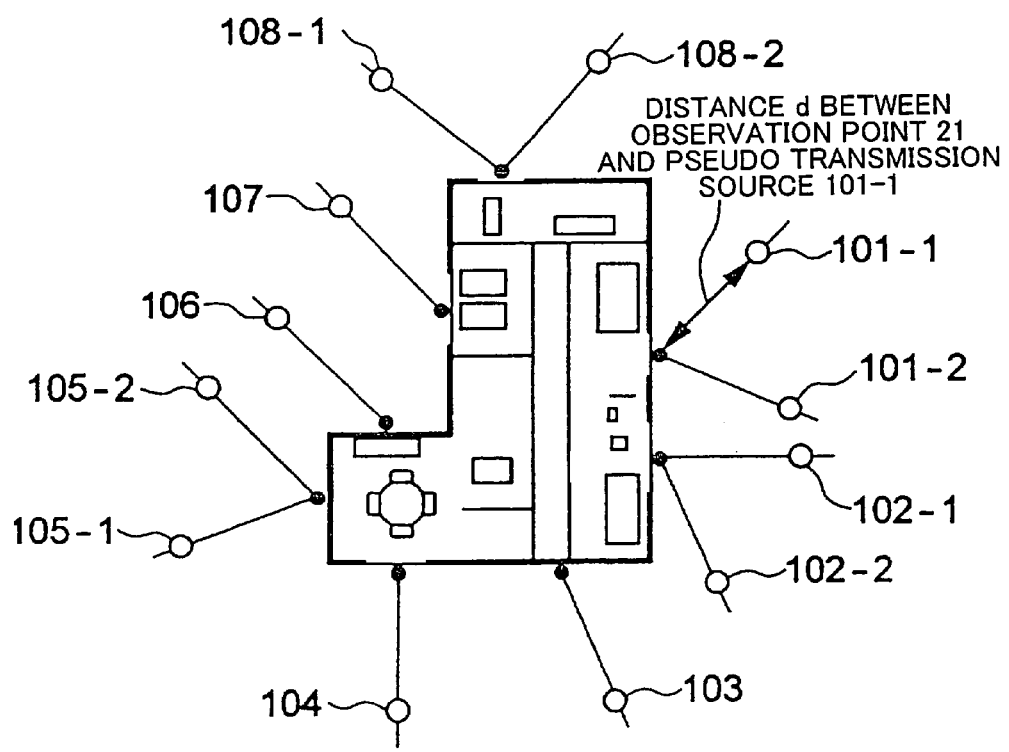
FIG. 28 is a diagram showing disposition of pseudo transmission sources in the fifth example.

Next steps S53 and S54 are the same as the steps S43 and S44 in the fourth example, and extraction of the analysis area 3 and disposition of the pseudo transmission sources 101-1 to 108-2 are conducted. FIG. 28 shows disposition of the pseudo transmission sources 101-1 to 108-2 in the present example.

In addition, transmission power of each of the disposed pseudo transmission sources is determined according to the equation (5) (step S55).

Figure 29:
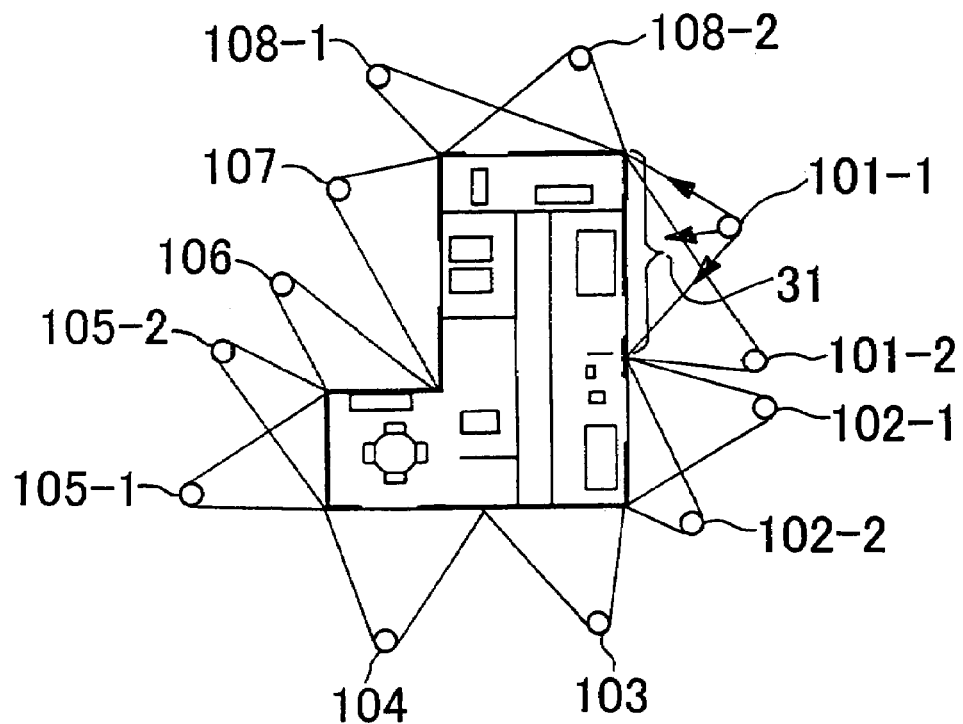
FIG. 29 is a diagram showing radio wave propagation estimation using the ray launching method in the fifth example.

At the next step S56, radio wave propagation estimation is conducted by designating the pseudo transmission sources 101-1 to 108-2 disposed at the step S54 as new transmission sources and the analysis area 3 as the object. At this time, a ray emitted from each pseudo transmission source is provided with a delay corresponding to the arrival delay time obtained at the step S52. FIG. 29 shows a conceptional diagram of radio wave propagation estimation conducted at the step S56. In the present example as well, the ray launching method, which is one of the ray tracing methods, is used to estimate the propagation environment of the investigation object area 2, in the same way as the pertinent portion in the first to fourth examples.

In the same way as the steps S36 and S46 in the three and four examples, the ray emission direction is restricted only to an outer wall represented by an observation point corresponding to each pseudo transmission source. For example, the ray emission direction of the pseudo transmission source 101-1 is restricted only to an outer wall 31.

As a matter of course, it is possible to previously store the operation flow in each of the above-described examples on a recording medium (the memory 50 in FIG. 5), such as a ROM, as a program, and cause a CPU, which is a computer, to read and execute the operation flow.

The invention claimed is:

1. A radio wave propagation characteristic estimation system for estimating a radio wave propagation environment in an investigation object area, the radio wave propagation characteristic estimation system being provided, in a three-dimensional area including a plurality of contents, with a transmission source and the investigation object area to be investigated as to the propagation environment of radio waves emitted from the transmission source, the radio wave propagation characteristic estimation system comprising:
   first means for finding general radio wave propagation situation within the investigation object area or in vicinity thereof;
   second means for preparing finite pseudo transmission sources to simulate the general radio wave propagation situation; and
   third means for conducting detailed radio wave propagation estimation by designating the finite pseudo transmission sources as new transmission sources and designating an analysis area including the investigation object area as an analysis object.

2. The radio wave propagation characteristic estimation system according to claim 1, wherein the first means find received power at an observation point disposed in the investigation object area or in vicinity thereof, as the general radio wave propagation situation.

3. The radio wave propagation characteristic estimation system according to claim 2, wherein
   the analysis area is set so as to include the investigation object area and a plurality of contents located around the investigation object area, and
   the pseudo transmission sources are prepared outside the analysis area and near a line coupling the transmission source to the investigation object area.

4. The radio wave propagation characteristic estimation system according to claim 2, wherein
   the analysis area is set so as to be the same as the investigation object area,
   the pseudo transmission sources are prepared around the investigation object area, and transmission power of each of the pseudo transmission sources is determined on the basis of disposition situation of contents around the investigation object area.

5. The radio wave propagation characteristic estimation system according to claim 1, wherein the first means find a radio wave arrival direction and received power corresponding to the radio wave arrival direction, at an observation point disposed in the investigation object area or in vicinity thereof, as the general radio wave propagation situation.

6. The radio wave propagation characteristic estimation system according to claim 5, wherein
   the analysis area is set so as to be the same as the investigation object area,
   the pseudo transmission sources are prepared near a line extending from the observation point to the radio wave arrival direction.

7. The radio wave propagation characteristic estimation system according to claim 1, wherein the first means find received power, a radio wave arrival direction and radio wave arrival time of each multi-path component, at an observation point disposed in the investigation object area or in vicinity thereof, as the general radio wave propagation situation.

8. The radio wave propagation characteristic estimation system according to claim 7, wherein
   the analysis area is set so as to be the same as the investigation object area,
   the pseudo transmission sources are prepared near a line extending from the observation point to the radio wave arrival direction, and
   the third means take a delay corresponding to the radio wave arrival time into consideration when conducting the radio wave propagation estimation.

9. The radio wave propagation characteristic estimation system according to claim 1, wherein a ray tracing method is used in the radio wave propagation estimation conducted by the third means.

10. The radio wave propagation characteristic estimation system according to claim 1, wherein a statistical technique is used by the first means to find the general radio wave propagation situation.

11. The radio wave propagation characteristic estimation system according to claim 1, wherein a ray tracing method is used by the first means to find the general radio wave propagation situation.

12. The radio wave propagation characteristic estimation system according to claim 1, wherein an actual measurement is used by the first means to find the general radio wave propagation situation.

13. A radio wave propagation characteristic estimation method for estimating a radio wave propagation environment in an investigation object area, when, in a three-dimensional area including a plurality of contents, a transmission source and the investigation object area to be investigated as to the propagation environment of radio waves emitted from the transmission source are provided, the radio wave propagation characteristic estimation method comprising:
   a first step of finding general radio wave propagation situation within the investigation object area or in vicinity thereof;
   a second step of preparing finite pseudo transmission sources to simulate the general radio wave propagation situation; and
   a third step of conducting detailed radio wave propagation estimation by designating the finite pseudo transmission sources as new transmission sources and designating an analysis area including the investigation object area as an analysis object.

14. The radio wave propagation characteristic estimation method according to claim 13, wherein at the first step, received power at an observation point disposed in the investigation object area or in vicinity thereof is found as the general radio wave propagation situation.

15. The radio wave propagation characteristic estimation method according to claim 14, wherein
the analysis area is set so as to include the investigation object area and a plurality of contents located around the investigation object area, and
the pseudo transmission sources are prepared outside the analysis area and near a line coupling the transmission source to the investigation object area.

16. The radio wave propagation characteristic estimation method according to claim 14, wherein
the analysis area is set so as to be the same as the investigation object area,
the pseudo transmission sources are prepared around the investigation object area, and
transmission power of each of the pseudo transmission sources is determined on the basis of disposition situation of contents around the investigation object area.

17. The radio wave propagation characteristic estimation method according to claim 13, wherein at the first step, a radio wave arrival direction and received power corresponding to the radio wave arrival direction are found at an observation point disposed in the investigation object area or in vicinity thereof, as the general radio wave propagation situation.

18. The radio wave propagation characteristic estimation method according to claim 17, wherein
the analysis area is set so as to be the same as the investigation object area,
the pseudo transmission sources are prepared near a line extending from the observation point to the radio wave arrival direction.

19. The radio wave propagation characteristic estimation method according to claim 13, wherein at the first step, received power, a radio wave arrival direction and radio wave arrival time of each multi-path component are found at an observation point disposed in the investigation object area or in vicinity thereof, as the general radio wave propagation situation.

20. The radio wave propagation characteristic estimation method according to claim 19, wherein
the analysis area is set so as to be the same as the investigation object area,
the pseudo transmission sources are prepared near a line extending from the observation point to the radio wave arrival direction, and
a delay corresponding to the radio wave arrival time is taken into consideration when conducting the radio wave propagation estimation at the third step.

21. The radio wave propagation characteristic estimation method according to claim 13, wherein a ray tracing method is used in the radio wave propagation estimation conducted at the third step.

22. The radio wave propagation characteristic estimation method according to claim 13, wherein a statistical technique is used at the first step to find the general radio wave propagation situation.

23. The radio wave propagation characteristic estimation method according to claim 13, wherein a ray tracing method is used at the first step to find the general radio wave propagation situation.

24. The radio wave propagation characteristic estimation method according to claim 13, wherein an actual measurement is used at the first step to find the general radio wave propagation situation.

25. A computer readable medium embodying computer program product that, when executed, causes a computer to perform a method for estimating a radio wave propagation environment in an investigation object area, when, in a three-dimensional area including a plurality of contents, a transmission source and the investigation object area to be investigated as to the propagation environment of radio waves emitted from the transmission source are provided, the computer program product, when executed by the computer, causing the computer to perform:
processing for finding general radio wave propagation situation within the investigation object area or in vicinity thereof;
processing for preparing finite pseudo transmission sources to simulate the general radio wave propagation situation; and
processing for conducting detailed radio wave propagation estimation by designating the finite pseudo transmission sources as new transmission sources and designating an analysis area including the investigation object area as an analysis object.

* * * * *